US009467228B2

United States Patent
Nakashima et al.

(10) Patent No.: US 9,467,228 B2
(45) Date of Patent: Oct. 11, 2016

(54) OPTICAL TRANSMISSION SYSTEM AND OPTICAL TRANSMISSION METHOD

(71) Applicant: FUJITSU LIMITED, Kawasaki-shi, Kanagawa (JP)

(72) Inventors: Hisao Nakashima, Kawasaki (JP); Takeshi Hoshida, Kawasaki (JP); Takahito Tanimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/448,588

(22) Filed: Jul. 31, 2014

(65) Prior Publication Data

US 2014/0341587 A1 Nov. 20, 2014

Related U.S. Application Data

(63) Continuation of application No. PCT/JP2012/052562, filed on Feb. 3, 2012.

(51) Int. Cl.
*H04B 10/61* (2013.01)
*H04B 10/2575* (2013.01)
(Continued)

(52) U.S. Cl.
CPC ...... *H04B 10/2575* (2013.01); *H04B 10/2572* (2013.01); *H04B 10/6162* (2013.01); *H04J 14/06* (2013.01)

(58) Field of Classification Search
CPC .................................. H04B 10/6162
See application file for complete search history.

(56) References Cited

U.S. PATENT DOCUMENTS

| 2001/0028760 | A1* | 10/2001 | Yaffe | G02B 6/278 385/27 |
| 2004/0105682 | A1* | 6/2004 | Roberts | H04B 10/2572 398/147 |
| 2004/0197103 | A1* | 10/2004 | Roberts | H04B 10/2543 398/159 |

(Continued)

FOREIGN PATENT DOCUMENTS

| JP | 2005-65273 A | 3/2005 |
| JP | 2009-089194 A | 4/2009 |

(Continued)

OTHER PUBLICATIONS

Notification of Transmittal of Translation of the International Preliminary Report on Patentability (Form PCT/IB/338, PCT/IB/373 & Form PCT/ISA/237), PCT/JP2012/052562, 6 pages, dated Aug. 14, 2014.

(Continued)

*Primary Examiner* — Nathan Curs
(74) *Attorney, Agent, or Firm* — Fujitsu Patent Center

(57) ABSTRACT

An optical transmission system includes an optical transmitter and an optical receiver. The optical transmitter includes: a first digital signal processor configured to generate an electric-field information signal corresponding to a transmission signal; and a transmitter front-end configured to generate an optical signal from the electric-field information signal. The optical receiver includes: a receiver front-end configured to generate an electric signal corresponding to the optical signal; and a second digital signal processor configured to detect polarization dependent effects on the optical signal based on the electric signal. The first digital signal processor corrects the electric-field information signal based on the polarization dependent effects detected by the second digital signal processor in the optical receiver.

7 Claims, 26 Drawing Sheets

(51) Int. Cl.
*H04J 14/06* (2006.01)
*H04B 10/2507* (2013.01)

(56) References Cited

U.S. PATENT DOCUMENTS

| | | |
|---|---|---|
| 2005/0036727 A1 | 2/2005 | Wijngaarden et al. |
| 2009/0196602 A1* | 8/2009 | Saunders ........... H04B 10/5053 398/26 |
| 2010/0111531 A1 | 5/2010 | Tanimura et al. |
| 2010/0189438 A1 | 7/2010 | Hoshida |
| 2011/0274430 A1 | 11/2011 | Nakashima et al. |

FOREIGN PATENT DOCUMENTS

| | | |
|---|---|---|
| JP | 2010-109705 A | 5/2010 |
| JP | 2010-178091 A | 8/2010 |
| JP | 2011-514736 A | 5/2011 |
| JP | 2011-223185 A | 11/2011 |
| JP | 2011-250037 | 12/2011 |
| JP | 2013-162182 | 8/2013 |

OTHER PUBLICATIONS

"Impact of Polarization Dependent Loss and Cross-Phase Modulation on Polarization Multiplexed DQPSK Signals",O. Vassilieva et al., OFC/NFOEC 2008, paper OThU6.pdf, 2008(Total number of pages: 3).

International Search Report, mailed in connection with PCT/JP2012/052562 and mailed Mar. 19, 2012.

JPOA—Office Action for Japanese Patent Application No. 2013-556180 dated Jul. 7, 2015,with English translation of the relevant part p. 2 line 4 to p. 4 line 8.

* cited by examiner $$T_\theta = \begin{pmatrix} \cos\theta & -\sin\theta \\ \sin\theta & \cos\theta \end{pmatrix}$$

FIG. 10A $$T_{PDL} = \begin{pmatrix} 10^{\frac{PDL}{2*20}} & 0 \\ 0 & 10^{\frac{-PDL}{2*20}} \end{pmatrix}$$

FIG. 10B

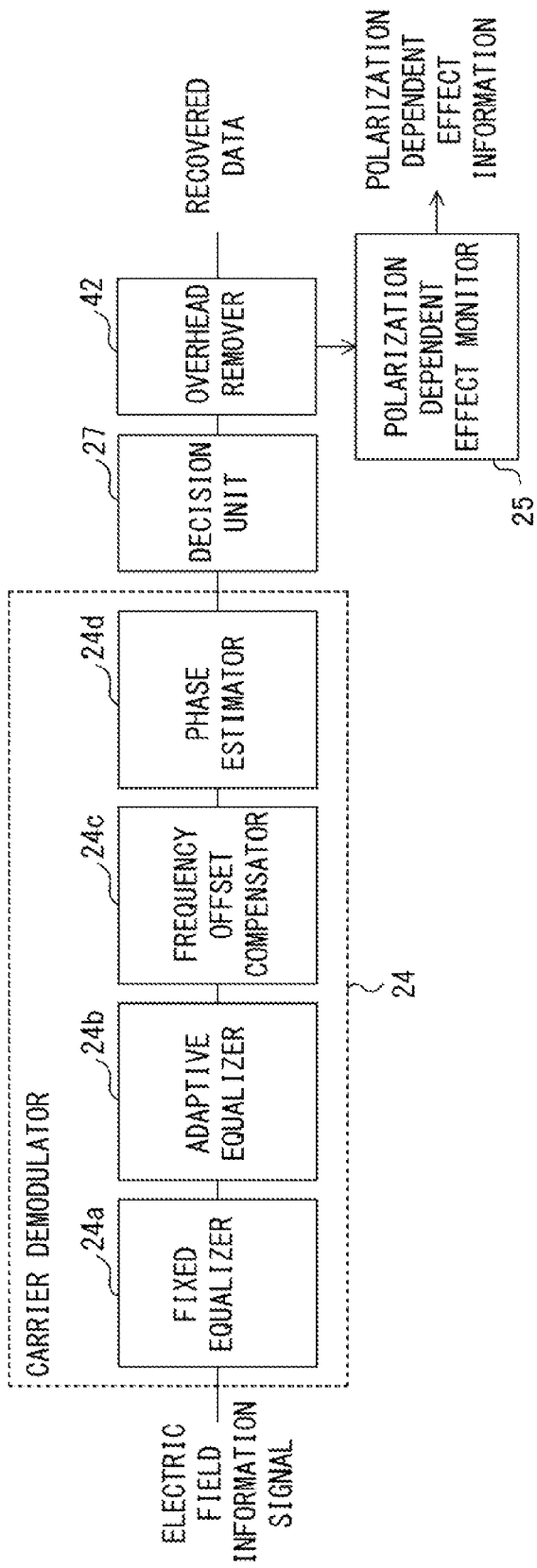
F I G. 14

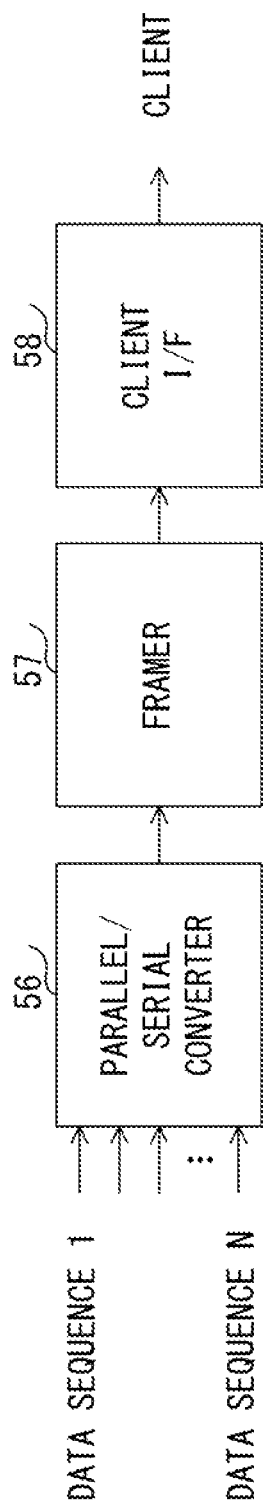
F I G. 17A

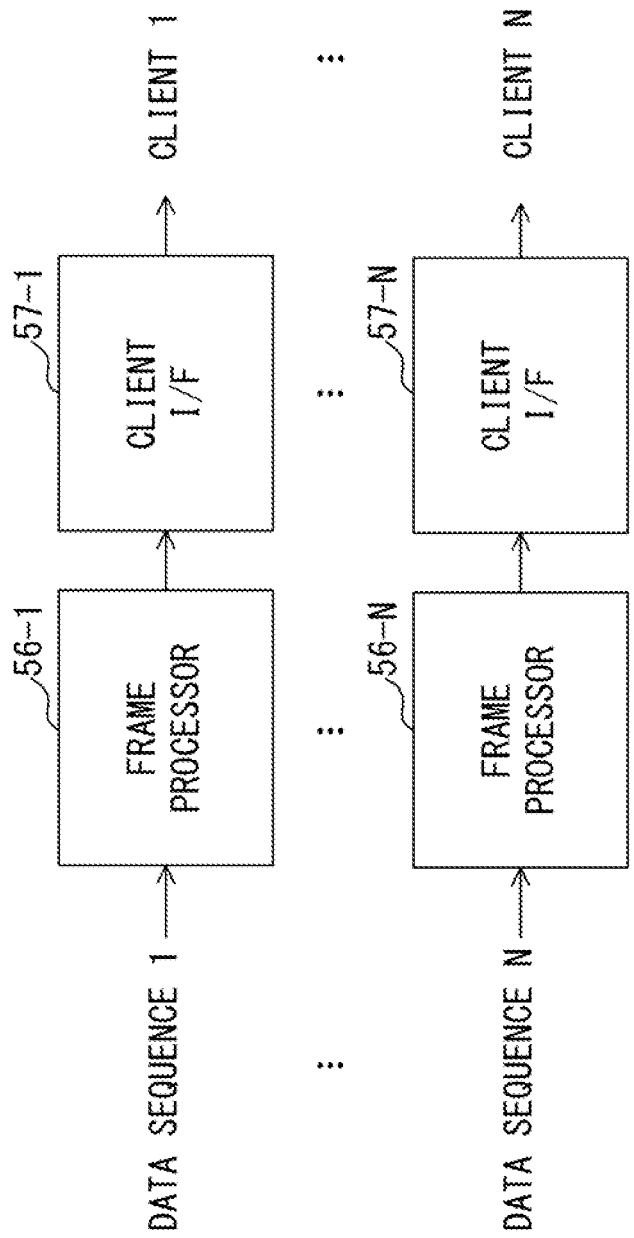
F I G. 17B

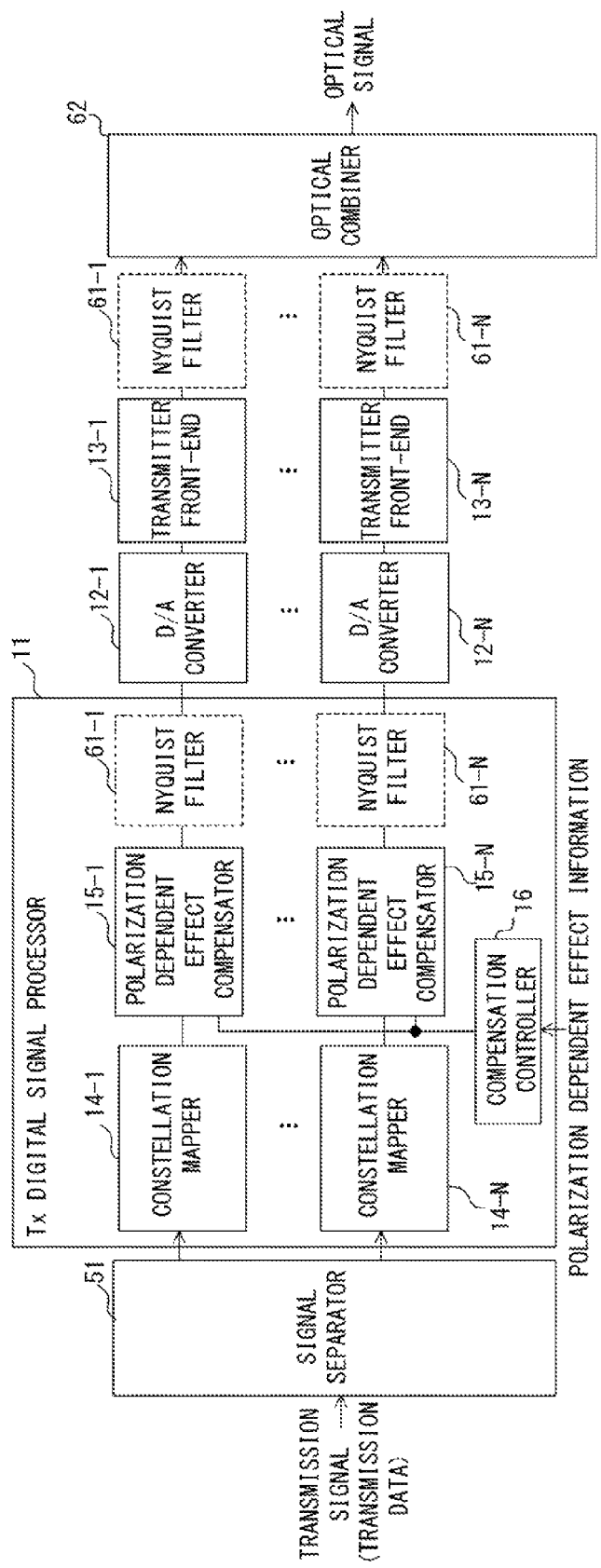
F I G. 18 A

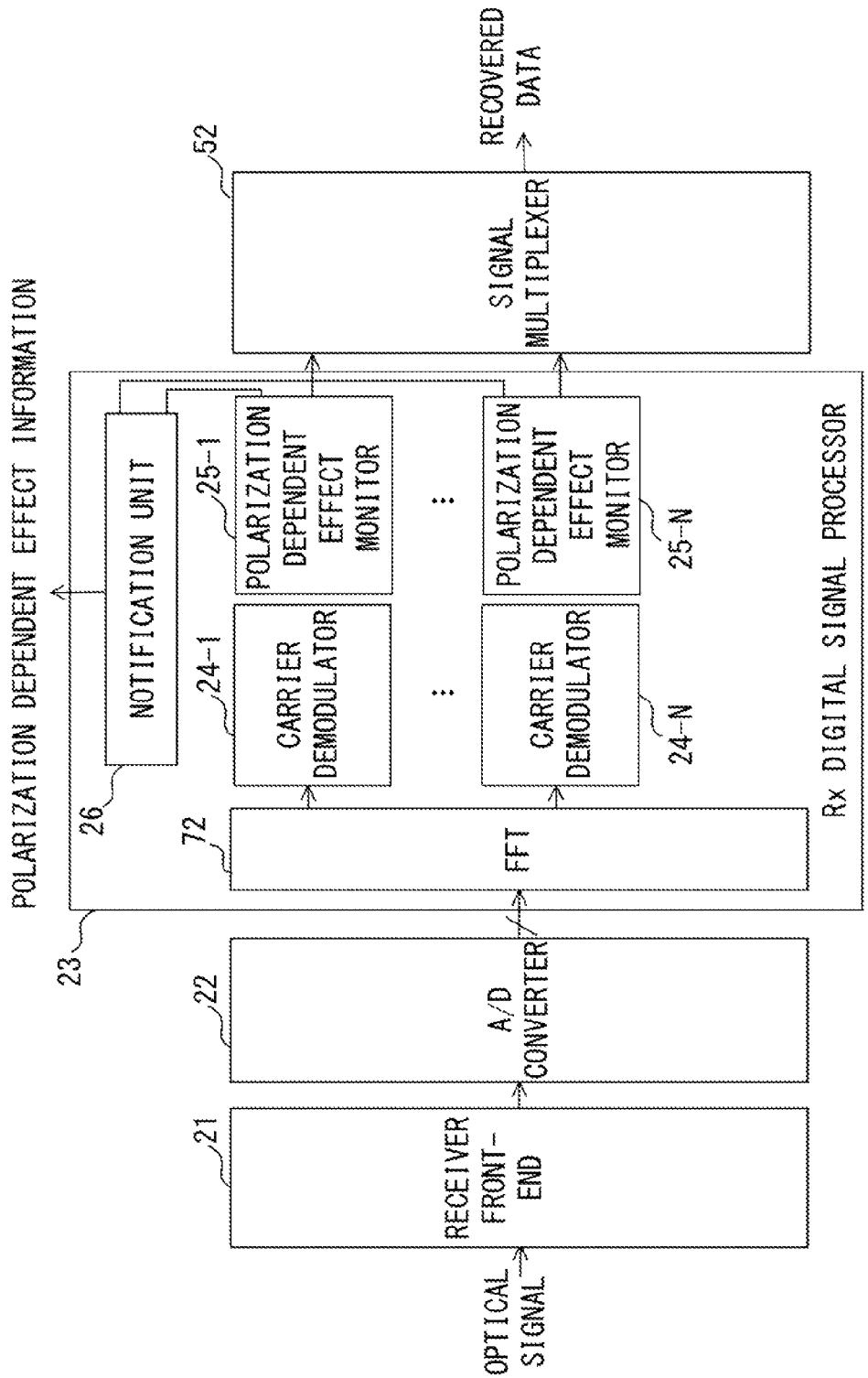
F I G. 19 B

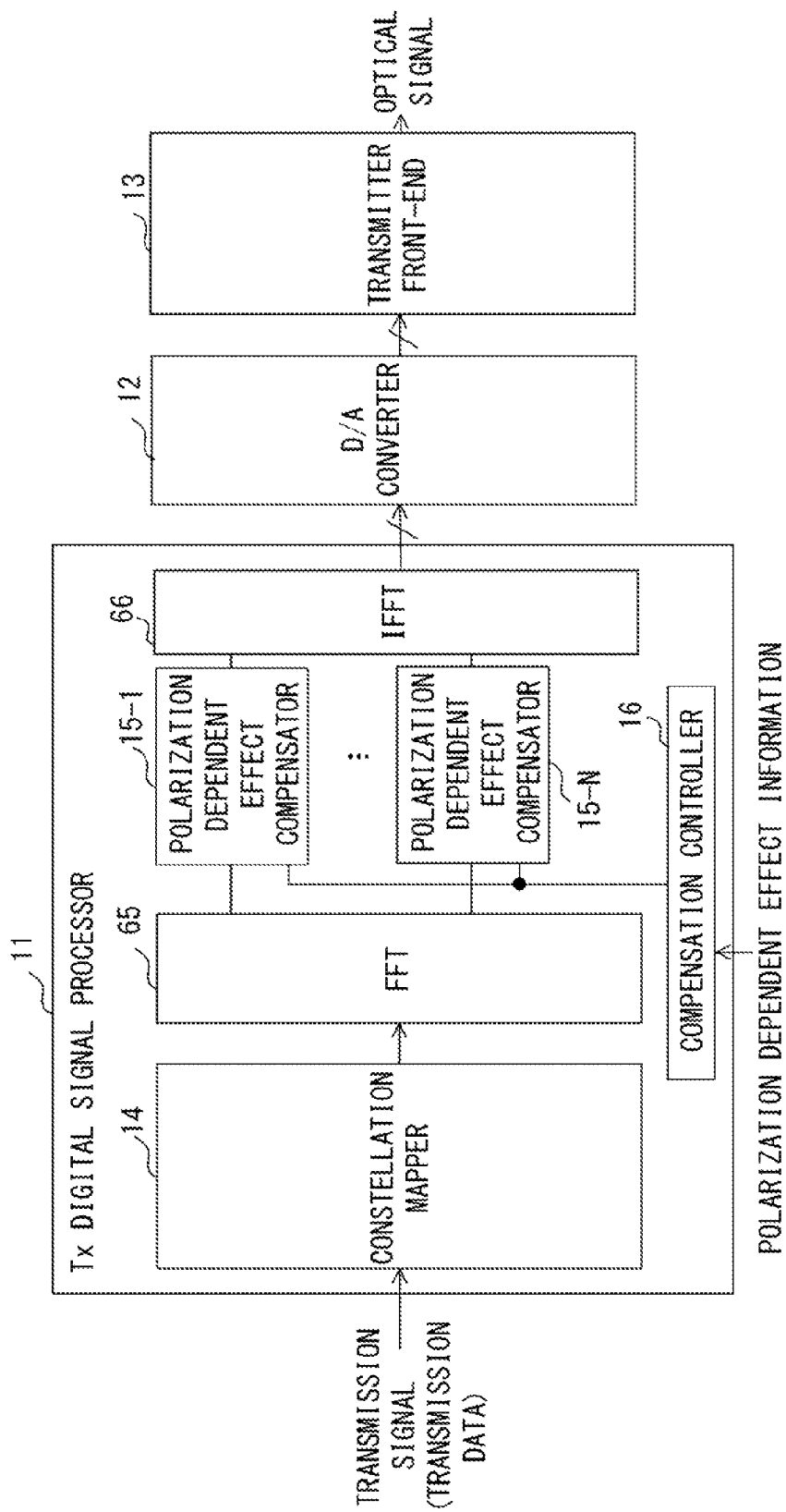
F I G. 21

OPTICAL TRANSMISSION SYSTEM AND OPTICAL TRANSMISSION METHOD

CROSS-REFERENCE TO RELATED APPLICATIONS

This application is a continuation application of International Application PCT/JP2012/052562 filed on Feb. 3, 2012 and designated the U.S., the entire contents of which are incorporated herein by reference.

FIELD

The embodiments discussed herein are related to an optical transmission system and an optical transmission method.

BACKGROUND

In order to achieve a long-distance and large-capacity transmission system, techniques for transmitting optical signals using digital signal processing have been studied and developed. Optical transmitters using digital signal processing can generate optical signals in any desired modulation format. For example, generating optical signals using multilevel modulation formats (QPSK, 16QAM-256QAM and the like) increases the number of bits per symbol. In addition, digital signal processing can provide multicarrier transmission (OFDM, Nyquist WDM and the like). Also, optical receivers using digital signal processing can compensate for the waveform distortions of received optical signals. As an example, there is known a method of using digital signal processing to compensate for waveform distortions due to chromatic dispersion or the like.

Polarization multiplexing has been in practical use as another technique to achieve large-capacity transmission. In polarization multiplexing, two optical signals are transmitted using a pair of orthogonal polarizations (x-polarization and y-polarization). Therefore, polarization multiplexing transmission can double transmission capacity compared to single-polarization transmission. Generally, in polarization multiplexing transmission, it is preferable that optical signals in different polarization channels have the same optical power.

An optical transmission line, however, has polarization dependent loss (PDL). If polarization multiplexed optical signals are transmitted via a transmission line that has polarization dependent loss, the optical signals in an x-polarization channel and a y-polarization channel will suffer different losses. That is, in an optical transmission line that has polarization dependent loss, an optical power difference arises between the polarization channels. In this case, the characteristics of the optical signals (in particular, optical signal-to-noise ratio, OSNR) differ between the polarization channels.

Configurations taking this problem into consideration have been proposed. As one example, a configuration (e.g., Japanese Laid-Open Patent Publication No. 2009-89194) is proposed that varies the allocation of data (bits) to the polarization channels so that each bit of the channel to be transmitted by x-polarization and each bit of the channel to be transmitted by y-polarization in the case of normal allocation are switched around in a required ratio. As another example, a configuration (e.g., Japanese Laid-Open Patent Publication No. 2010-109705) is proposed that implements polarization scrambling of transmitted signal light by digital signal processing.

According to the above proposed configurations, even if there is polarization dependent loss, degradations in the polarization channels are equalized with respect to the time axis to reduce differences in average bit error rate between the polarization channels. These configurations, however, do not reduce the difference in OSNR between the polarizations and therefore cannot sufficiently improve transmission characteristics.

Meanwhile, using digital signal processing enables compensating for the waveform distortions of optical signals. Therefore, chromatic dispersion and/or polarization mode dispersion may be compensated for by digital signal processing. However, since polarization dependent loss causes degradation of OSNR, it is difficult to compensate for the degradation of transmission characteristics due to polarization dependent loss even if digital signal processing is used for an optical receiver.

SUMMARY

According to an aspect of the embodiments, an optical transmission system includes an optical transmitter and an optical receiver. The optical transmitter includes: a first digital signal processor configured to generate an electric-field information signal corresponding to a transmission signal; and a transmitter front-end configured to generate an optical signal from the electric-field information signal. The optical receiver includes: a receiver front-end configured to generate an electric signal corresponding to the optical signal; and a second digital signal processor configured to detect polarization dependent effects on the optical signal based on the electric signal. The first digital signal processor corrects the electric-field information signal based on the polarization dependent effects detected by the second digital signal processor in the optical receiver.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 10A and 10B illustrate rotation transformation and amplitude transformation;

FIG. 14 illustrates an example of the carrier demodulator and the polarization-dependent effect monitor according to the second embodiment;

FIGS. 17A and 17B illustrate configurations for transmitting a signal to a client;

FIG. 18A illustrates an example of the configuration of the optical transmitter according to the third embodiment;

FIG. 19B illustrates an example of the configuration of the optical receiver corresponding to the optical transmitter illustrated in FIG. 19A;

FIG. 21 illustrates still another example of the configuration of the optical transmitter according to the third embodiment.

DESCRIPTION OF EMBODIMENTS

First Embodiment

Figure 1:
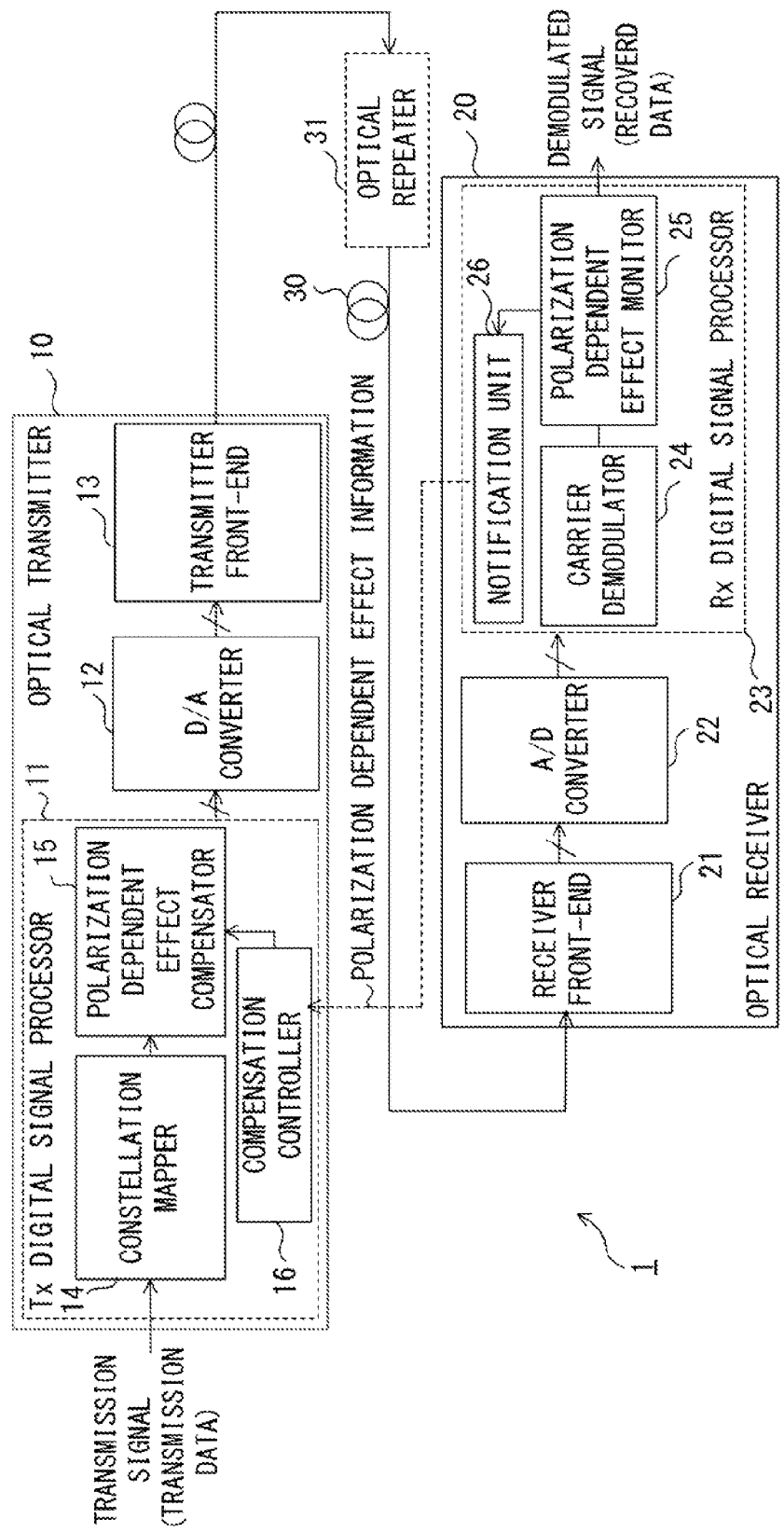
FIG. 1 illustrates the configuration of the optical transmission system according to the first embodiment.

FIG. 1 illustrates the configuration of the optical transmission system according to the first embodiment. The optical transmission system 1 according to the first embodiment includes an optical transmitter 10 and an optical receiver 20. The optical transmitter 10 generates an optical signal corresponding to a transmission signal (transmission data) to output the optical signal to an optical transmission line 30. The transmission data is generated, for example, by a client signal from an IP router (not shown) or the like, or by adding an overhead for supervisory control to the client signal. The optical transmission line 30 is implemented by an optical fiber. The optical transmission line 30 may be provided with one or a plurality of optical repeater 31. The optical repeater 31 includes an optical amplifier and can amplify an optical signal. The optical receiver 20 demodulates the optical signal received from the optical transmitter 10 and recovers the transmission data.

The optical transmitter 10 includes a Tx digital signal processor 11, a D/A converter 12, and a transmitter front-end 13. The Tx digital signal processor 11 includes a constellation mapper 14, a polarization-dependent effect compensator 15, and a compensation controller 16. The constellation mapper 14 generates an electric-field information signal corresponding to a transmission signal. In this example, the electric-field information signal includes an x-polarization signal and a y-polarization signal, which are transmitted using orthogonal x-polarization and y-polarization, respectively. In accordance with the control of the compensation controller 16, the polarization-dependent effect compensator 15 corrects the electric-field information signal generated by the constellation mapper 14. The compensation controller 16 controls the polarization-dependent effect compensator 15 according to polarization-dependent effect information received from the optical transmitter 20. That is, the Tx digital signal processor 11 outputs the electric-field information signal corrected according to the polarization-dependent effect information.

The Tx digital signal processor 11 includes, for example, a processor for executing a given program and memory. In this case, the Tx digital signal processor 11 provides the functions of the constellation mapper 14, the polarization-dependent effect compensator 15, and the compensation controller 16 by executing the given program. The Tx digital signal processor 11 may be implemented by a single semiconductor chip. In this case, the Tx digital signal processor 11 may be implemented, for example, by an LSI that is independent of the D/A converter 12 and the transmitter front-end 13, or may be integrated with them. Also, the Tx digital signal processor 11 may include a hardware circuit for processing digital signals.

The D/A converter 12 converts the electric-field information signal generated by the Tx digital signal processor 11 into an analog signal. The electric-field information signal output from the D/A converter 12 is given to the transmitter front-end 13.

The transmitter front-end 13 includes an optical modulator and generates an optical signal according to the electric-field information signal given from the D/A converter 12. That is, the electric-field information signal is given to the transmitter front-end 13 as a drive signal for the optical modulator. The transmitter front-end 13 outputs the generated optical signal to the optical transmission line 30.

The optical receiver 20 includes a receiver front-end 21, an A/D converter 22, and an Rx digital signal processor 23. The receiver front-end 21 generates an electric signal corresponding to the electric field information of the optical signal received via the optical transmission line 30. The receiver front-end 21 is, for example, a coherent receiver front-end circuit. In this case, the receiver front-end 21 obtains the electric field information of the optical signal by using local oscillation light.

The A/D converter 22 converts the electric signal generated by the receiver front-end 21 into a digital signal. The digital signal represents the electric field information of the received optical signal. The digital signal is input to the Rx digital signal processor 23.

The Rx digital signal processor 23 includes a carrier demodulator 24, a polarization-dependent effect monitor 25, and a notification unit 26. The carrier demodulator 24 demodulates the received optical signal according to the digital signal given from the A/D converter 22. The polarization-dependent effect monitor 25 detects the degradations of characteristics (hereinafter referred to as polarization dependent effects) that occur in the optical signal due to polarization dependent loss. While the method of detecting polarization dependent effects is not particularly limited, for example, the polarization-dependent effect monitor 25 detects polarization dependent effects based on demodulated signals output from the carrier demodulator 24. Note that the polarization-dependent effect monitor 25 may detect polarization dependent effects based on data recovered from the demodulated signals. Alternatively, the polarization-dependent effect monitor 25 may detect polarization dependent effects based on the operating state of the carrier demodulator 24. The polarization-dependent effect monitor 25 then generates polarization-dependent effect information representing the detected polarization dependent effects. The notification unit 26 transmits the polarization-dependent effect information generated by the polarization-dependent effect monitor 25 to the optical transmitter 10.

The Rx digital signal processor 23 includes, for example, a processor for executing a given program and memory. In this case, the Rx digital signal processor 23 provides the functions of the carrier demodulator 24, the polarization-dependent effect monitor 25, and the notification unit 26 by executing the given program. The Rx digital signal processor 23 may be implemented by a single semiconductor chip. In this case, the Rx digital signal processor 23 may be implemented, for example, by an LSI that is independent of the receiver front-end 21 and the A/D converter 22, or may be integrated with them. Also, the Rx digital signal processor 23 may include a hardware circuit for processing digital signals.

As described above, the optical transmitter 10 corrects the electric-field information signal based on the polarization-dependent effect information received from the optical receiver 20, and transmits the optical signal generated by the corrected electric-field information signal to the optical receiver 20. At this time the optical transmitter 10 corrects the electric-field information signal in such a way as to reduce the polarization dependent effects detected by the optical receiver 20. That is, feedback control for compensating for or suppressing the polarization dependent effects is performed. Therefore, the optical transmission system 1 mitigates the degradation of signal quality due to polarization dependent loss.

Figure 2:
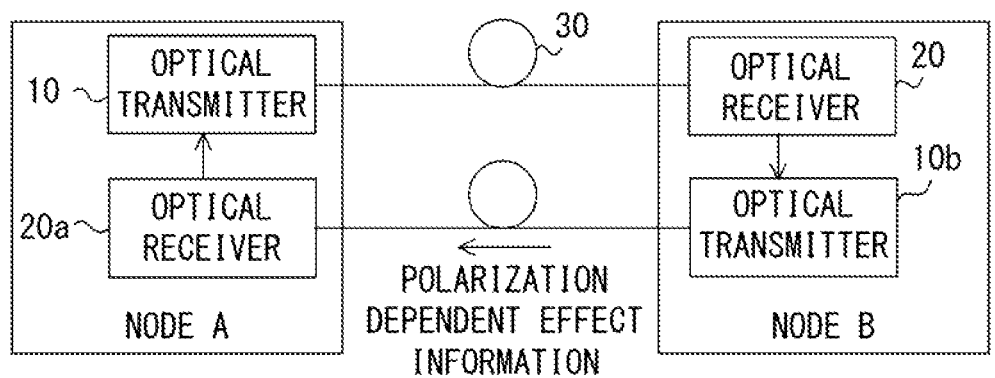
FIG. 2 illustrates a method of sending polarization-dependent effect information.

The method of sending the polarization-dependent effect information from the optical receiver 20 to the optical transmitter 10 is not particularly limited, and any method may be used. For example, as illustrated in FIG. 2, the optical transmitter 10 is provided at a node A and the optical receiver 20 is provided at a node B. In addition, the node A has an optical receiver 20a and the node B has an optical transmitter 10b. In this case, the polarization-dependent effect information generated by the optical receiver 20 is transmitted to the optical receiver 20a of the node A by using the optical transmitter 10b. The optical transmitter 10 obtains the polarization-dependent effect information from the optical receiver 20a.

The polarization-dependent effect information may be transmitted by using a supervisory control signal of the optical transmission system 1. Also, the polarization-dependent effect information may be transmitted by using a dedicated supervisory control signal between the optical transmitter 10 and the optical receiver 20. Transmitting the supervisory control signals is implemented, for example, by frequency modulating a carrier. Further, the polarization-dependent effect information may be sent from the optical receiver 20 to the optical transmitter 10 by way of a network management system that manages the optical transmission system 1.

Figure 3:
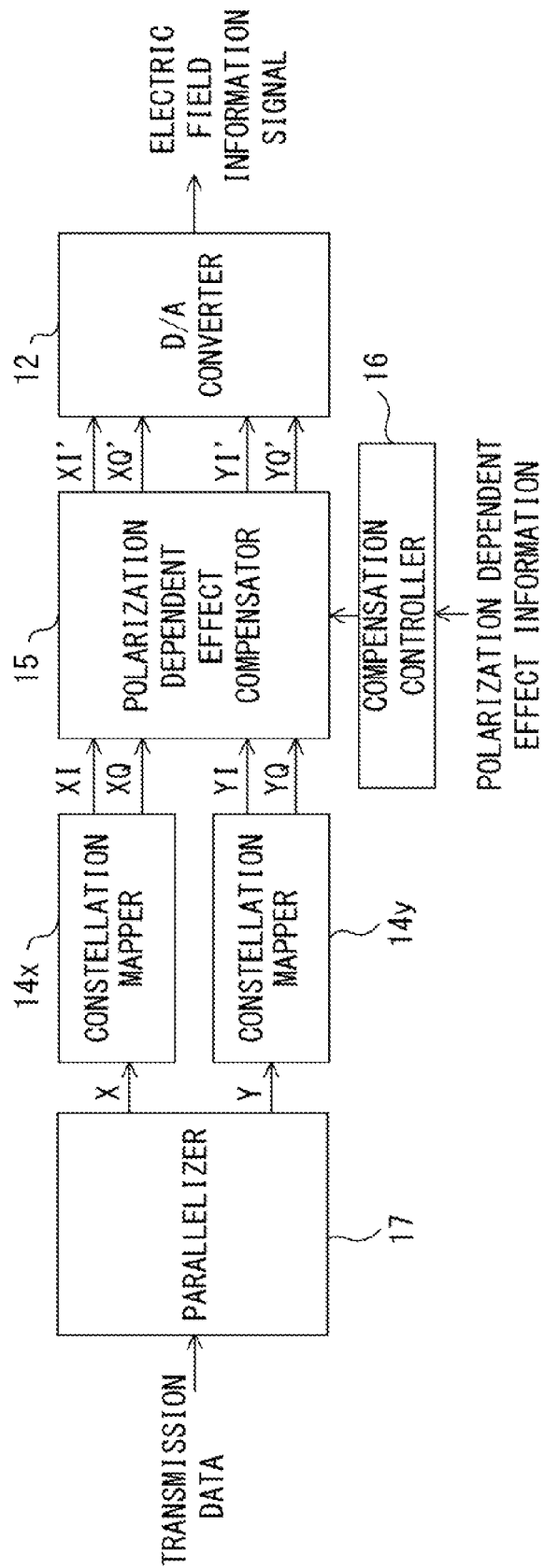
FIG. 3 illustrates the operation of a Tx digital signal processor.

FIG. 3 illustrates the operation of the Tx digital signal processor 11. In this example, a parallelizer 17 generates data X and data Y from transmission data. The parallelizer 17 operates as a serial/parallel converter. If an input signal is a parallel signal, the parallelizer 17 may change the number of bits in parallel signal. Also, the parallelizer 17 may be part of the optical transmitter 10 or may be provided outside of the optical transmitter 10. The data X and the data Y are transmitted in parallel by polarization multiplexed optical signals, which will be described later. Note that if the mutually independent data X and data Y are input to the optical transmitter 10, the parallelizer 17 is not necessarily required.

The constellation mapper 14 includes constellation mappers 14x and 14y. The data X and the data Y are guided respectively to the constellation mappers 14x and 14y.

Figure 4:
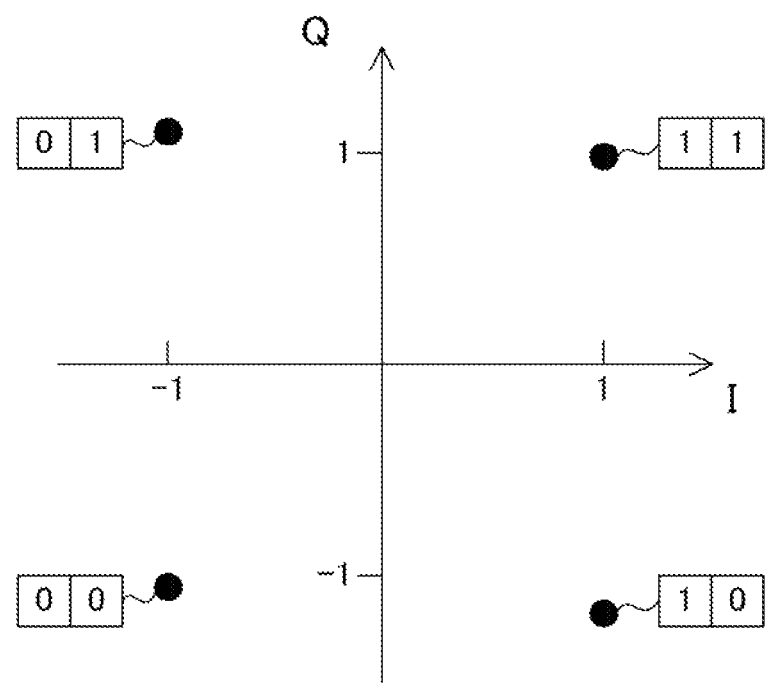
FIG. 4 illustrates an example of constellation mapping.

The constellation mapper 14x generates an x-polarization signal from the data X. The x-polarization signal represents the optical electric field information of the data X using an I-component and a Q-component. Here the constellation mapper 14x maps one or a plurality of bits of the data X onto a constellation according to the designated modulation format. For example, if the data X are transmitted by QPSK, the constellation mapper 14x performs constellation mapping in such a way that one symbol transmits two bits of data, as illustrated in FIG. 4. In the example illustrated in FIG. 4, two-bit data "11", "01", "00", and "10" are mapped onto coordinates (1,1), (−1, 1), (−1, −1), and (1, −1) on the constellation, respectively. While QPSK is used as an example in FIG. 4, other modulation formats (M-QAM, OFDM and the like) may also be used. In FIG. 3, the I-component and Q-component of the x-polarization signal generated by the constellation mapper 14x are denoted by XI and XQ, respectively. The x-polarization signal is represented by the following complex number:

$$x\text{-polarization signal} = XI + jXQ$$

The constellation mapper 14y operates in substantially the same way as the constellation mapper 14x. The constellation mapper 14y, however, generates a y-polarization signal from the data Y. The constellation mapper 14y then outputs YI and YQ. The y-polarization signal is represented by the following complex number:

$$y\text{-polarization signal} = YI + jYQ$$

The x-polarization signal (XI, XQ) generated by the x-constellation mapper 14x and the y-polarization signal (YI, YQ) generated by the constellation mapper 14y are given to the polarization-dependent effect compensator 15. The polarization-dependent effect compensator 15 corrects the x-polarization signal and the y-polarization signal according to the control of the compensation controller 16. The corrected x-polarization signal and the corrected y-polarization signal are respectively represented by the following complex numbers:

$$XI' + jXQ'$$

$$YI' + jYQ'$$

Note that examples of corrections by the polarization-dependent effect compensator 15 will be described later.

The polarization-dependent effect compensator 15 outputs signals XI', XQ', YI', YQ' obtained by the above corrections. The D/A converter 12 respectively converts the signals XI', XQ', YI', YQ' into analog signals.

Figure 5:
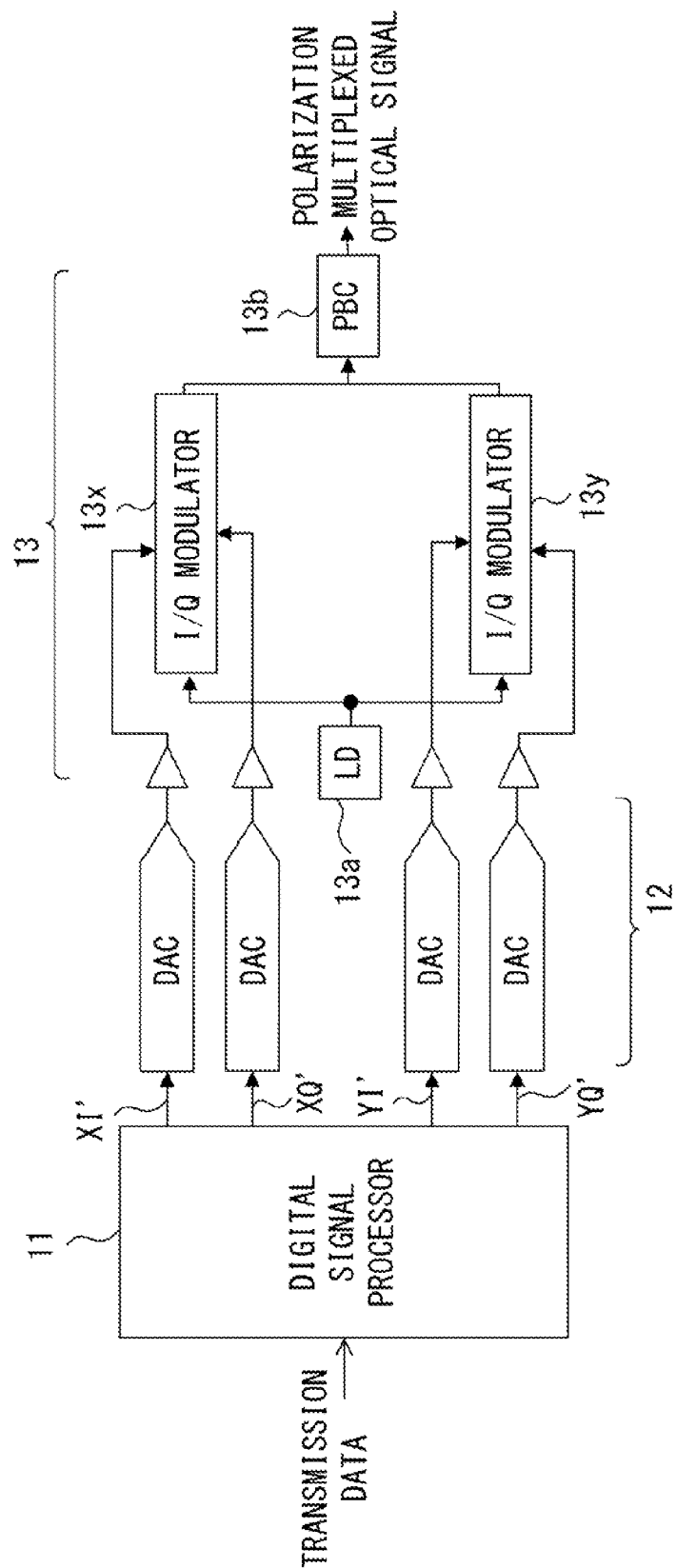
FIG. 5 illustrates an example of a transmitter front-end.

FIG. 5 illustrates an example of the transmitter front-end 13. As explained in reference to FIG. 4, the Tx digital signal processor 11 outputs the signals XI', XQ', YI', YQ'. The signals XI', XQ', YI', YQ' are converted into analog signals by the D/A converter 12 and given to the transmitter front-end 13.

The transmitter front-end 13 includes a light source (LD) 13a, I/Q modulators 13x and 13y, and a polarization beam combiner (PBC) 13b. The light source 13a is, for example, a laser diode and outputs continuous wave light. The continuous wave light is branched and guided to the I/Q modulators 13x and 13y.

Signals XI' and XQ' are given to the I/Q modulator 13x. The I/Q modulator 13x modulates the continuous wave light with the signals XI' and XQ' to generate x-polarization optical signal. Similarly, signals YI' and YQ' are given to the I/Q modulator 13y. The I/Q modulator 13y modulates the continuous wave light with the signals YI' and YQ' to generate y-polarization optical signal. In this way, XI' and XQ' are used as drive signals for the I/Q modulator 13x. Also, YI' and YQ' are used as drive signals for the I/Q modulator 13y. Additionally, the transmitter front-end 13, as illustrated in FIG. 5, may include amplifiers to amplify the signals XI', XQ', YI', YQ'.

The polarization beam combiner 13b multiplexes the x-polarization optical signal generated by the I/Q modulator 13x and the y-polarization optical signal generated by the I/Q modulator 13y. By so doing, a polarization multiplexed optical signal is generated. The polarization multiplexed optical signal is transmitted via the optical transmission line 30 illustrated in FIG. 1, and is received by the optical receiver 20.

Figure 6:
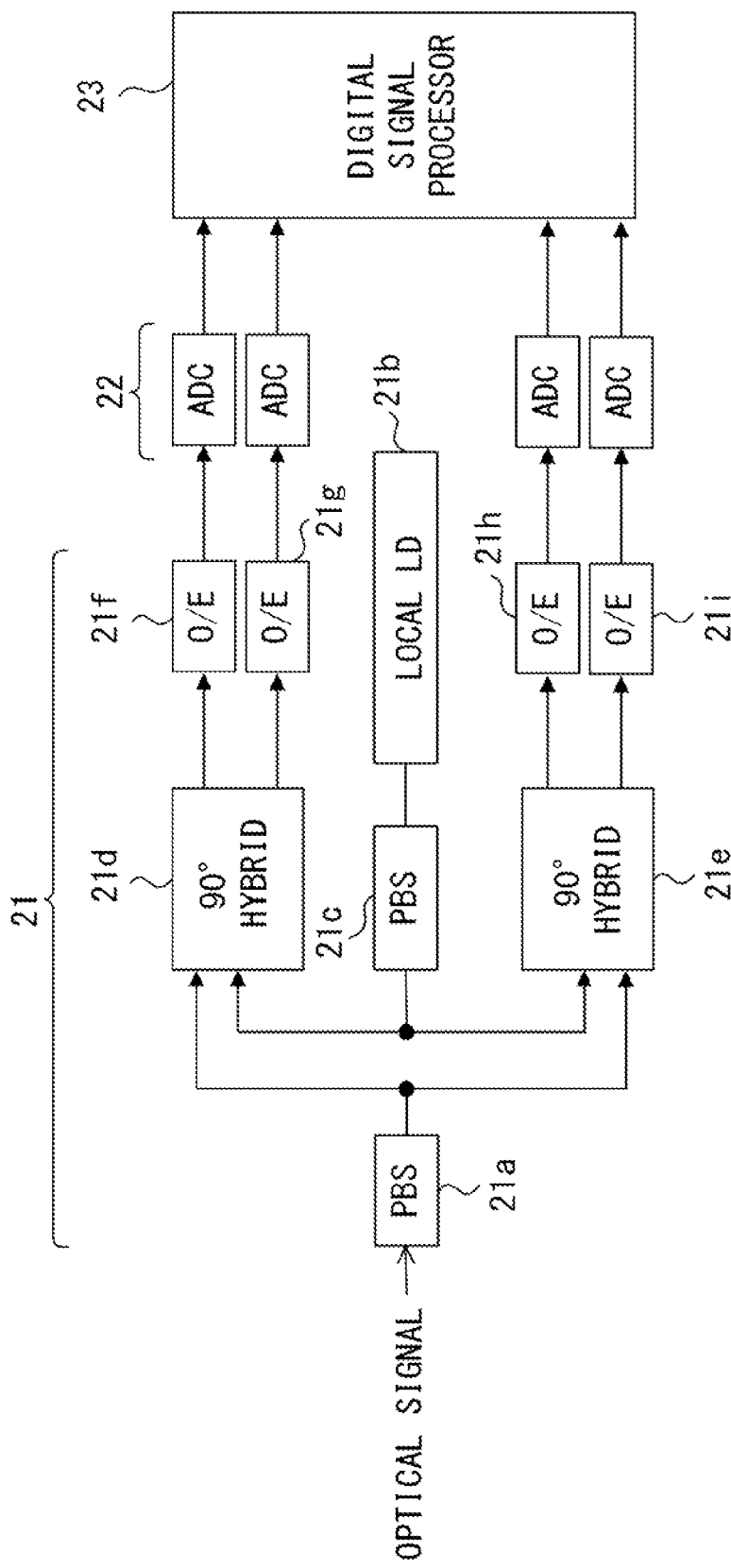
FIG. 6 illustrates an example of a receiver front-end.

FIG. 6 illustrates an example of the receiver front-end 21. The receiver front-end 21 is a coherent receiver, which receives the polarization multiplexed optical signal generated by the optical transmitter 10. The receiver front-end 21 includes a polarization beam splitter 21a, a local light source 21b, a polarization beam splitter 21c, 90-degree optical hybrid circuits 21d and 21e, and O/E converters 21f to 21i.

The polarization beam splitter 21a splits the received optical signal into a pair of orthogonal polarizations. Hereinafter, one of the polarizations obtained by the polarization beam splitter 21a is referred to as a first polarization optical signal and the other of the polarizations is referred to as a second polarization optical signal. The first polarization optical signal is guided to the 90-degree optical hybrid circuit 21d and the second polarization optical signal is guided to the 90-degree optical hybrid circuit 21e.

The local light source 21b is, for example, a laser diode and generates local oscillation light. The local oscillation light is continuous wave light. The oscillating frequencies of the light source 13a and the local light source 21b are the same or substantially the same. The polarization beam splitter 21c splits the local oscillation light generated by the local light source 21b into orthogonal polarizations. One of the polarizations of the local oscillation light is guided to the 90-degree optical hybrid circuit 21d and the other of the polarizations of the local oscillation light is guided to the 90-degree optical hybrid circuit 21e.

The 90-degree optical hybrid circuit 21d outputs I-component light and Q-component light corresponding to the first polarization optical signal by using the local oscillation light given from the polarization beam splitter 21c and its 90-degree shifted local oscillation light. The O/E converters 21f and 21g convert the I-component light and the Q-component light output from the 90-degree optical hybrid circuit 21d into electrical signals, respectively. Accordingly, one set of electrical signals obtained by the O/E converters 21f and 21g represent the electric field information of the first polarization optical signal.

Similarly, the 90-degree optical hybrid circuit 21e outputs I-component light and Q-component light corresponding to the second polarization optical signal by using the local oscillation light given from the polarization beam splitter 21c and its 90-degree shifted local oscillation light. The O/E converters 21h and 21i convert the I-component light and the Q-component light output from the 90-degree optical hybrid circuit 21e into electrical signals, respectively. Accordingly, one set of electrical signals obtained by the O/E converters 21h and 21i represent the electric field information of the second polarization optical signal.

In this way, the receiver front-end 21 outputs the four electric signals (the signal representing the electric field information of the first polarization optical signal and the signal representing the electric field information of the second polarization optical signal). These signals are respectively converted into digital signals by the A/D converter 22 and given to the digital signal processor 23.

Figure 7:
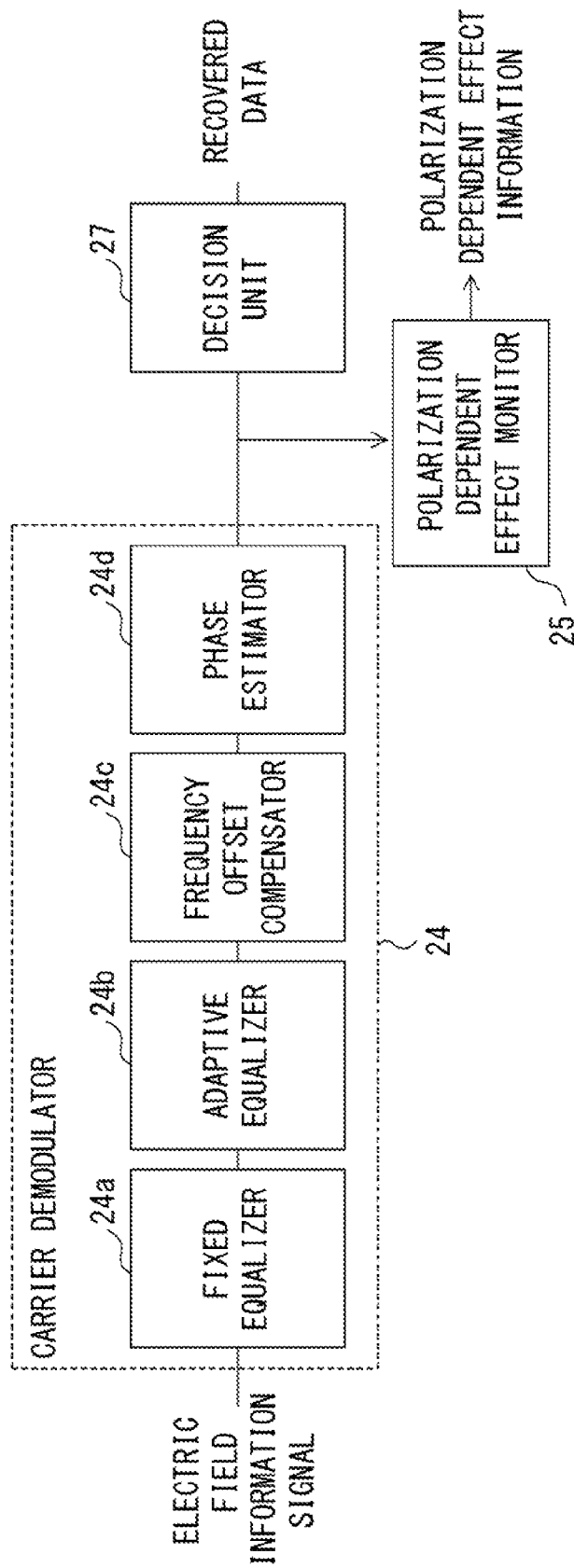
FIG. 7 illustrates an example of a carrier demodulator and a polarization-dependent effect monitor.

FIG. 7 illustrates an example of the carrier demodulator 24 and the polarization-dependent effect monitor 25. The electric signals (a signal representing the electric field information of the first polarization optical signal and a signal representing the electric field information of the second polarization optical signal) obtained by the receiver front-end 21 illustrated in FIG. 6 are input to the carrier demodulator 24.

The carrier demodulator 24 includes a fixed equalizer 24a, an adaptive equalizer 24b, a frequency offset compensator 24c, and a phase estimator 24d. The fixed equalizer 24a compensates for waveform distortion occurring in the optical transmission line 30. The fixed equalizer 24a is implemented, for example, by a digital filter. In this case, the tap coefficient of the digital filter is, for example, a specified value for compensating for chromatic dispersion in the optical transmission line 30. The adaptive equalizer 24b also compensates for waveform distortion occurring in the optical transmission line 30. The adaptive equalizer 24b is also implemented, for example, by a digital filter. However, the tap coefficient of the digital filter implementing the adaptive equalizer 24b is adaptively updated, for example, by feedback control.

The frequency offset compensator 24c compensates for a difference between the carrier frequency (i.e., the oscillating frequency of the light source 13a of the optical transmitter 10) of the received optical signal and the frequency (i.e., the oscillating frequency of the local light source 21b of the optical receiver 20) of the local oscillation light. The phase estimator 24d estimates and compensates for the phase shift of the carrier of the received optical signal. This compensates for a difference in phase between the light source 13a of the optical transmitter 10 and the local light source 21b of the optical receiver 20, and a phase shift occurring in the optical transmission line 30.

Thus, the carrier demodulator 24 demodulates the received optical signal. Demodulated signals (XI, XQ, YI, YQ) obtained by the carrier demodulator 24 are guided to the decision unit 27. While not particularly limited, the configurations and the operations of the fixed equalizer 24a, the adaptive equalizer 24b, the frequency offset compensator 24c, and the phase estimator 24d can be implemented using known art, so the detailed descriptions are omitted.

The decision unit 27 recovers the data X transmitted using x-polarization from the demodulated signals (XI, XQ), and recovers the data Y transmitted using y-polarization from the demodulated signals (YI, YQ). By so doing, the transmission data is recovered. The decision unit 27 may be provided within the Rx digital signal processor 23 or be provided outside of the Rx digital signal processor 23. While not particularly limited, the configuration and operation of the decision unit 27 can be implemented using known art, so the detailed descriptions are omitted.

Figure 8A:
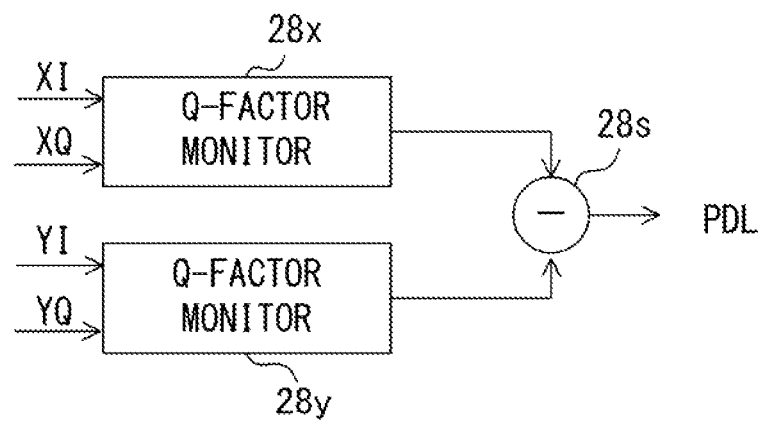
FIGS. 8A and 8B illustrate examples of the polarization-dependent effect monitor.

The polarization-dependent effect monitor 25 detects polarization dependent effects on the polarization multiplexed optical signal based on the demodulated signals (XI, XQ, YI, YQ) obtained by the carrier demodulator 24. In this embodiment, the polarization-dependent effect monitor 25 includes two Q-factor monitors 28x and 28y and a subtracter 28s, as illustrated in FIG. 8A. The demodulated signals XI and XQ are given to the Q-factor monitor 28x, and the demodulated signals YI and YQ are given to the Q-factor monitor 28y. The configurations and operations of the Q-factor monitors 28x and 28y are substantially the same.

Figure 8B:
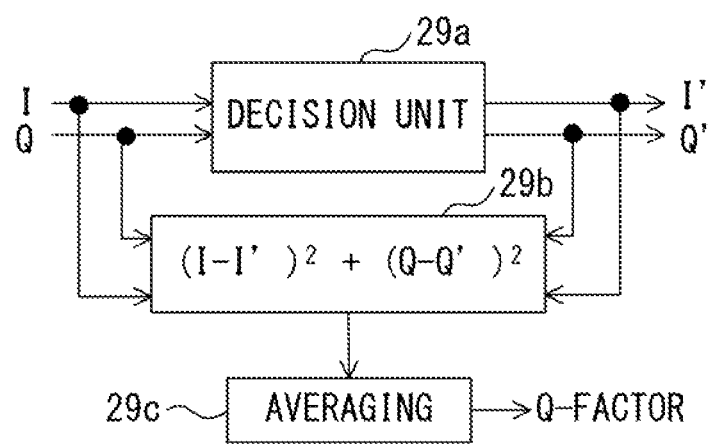

FIG. 8B illustrates an example of the Q-factor monitors 28x and 28y illustrated in FIG. 8A. Note that, the input signals I and Q illustrated in FIG. 8B correspond respectively to "XI and XQ" or "YI and YQ" illustrated in FIG. 8A.

The Q-factor monitor includes a decision unit 29a, a calculator 29b, and an average calculator 29c. The decision unit 29a performs a data decision on the input signals I and Q to obtain I' and Q'. In QPSK illustrated in FIG. 4, I' and Q' are, respectively, "1" or "−1". The calculator 29b calculates the distance between the constellation point of the input signal and the constellation point of the decided results. That is, the distance between the two points is calculated using the following formula:

distance $D=(I-I')+(Q-Q')^2$

The calculator 29b calculates the distance D for each symbol. The average calculator 29c calculates the average of the distances D obtained by the calculator 29b.

In this way, the Q-factor monitor 28x calculates the average distance DX corresponding to the optical signal transmitted using x-polarization. Also, the Q-factor monitor 28y calculates the average distance DY corresponding to the optical signal transmitted using y-polarization. The subtracter 288 calculates DX−DY and outputs the calculation result as polarization-dependent effect information. This polarization-dependent effect information is transmitted by the notification unit 26 to the optical transmitter 10. In the example illustrated in FIG. 8A, polarization dependent effects represented by PDL (Polarization Dependent Loss) is monitored.

Figure 9:
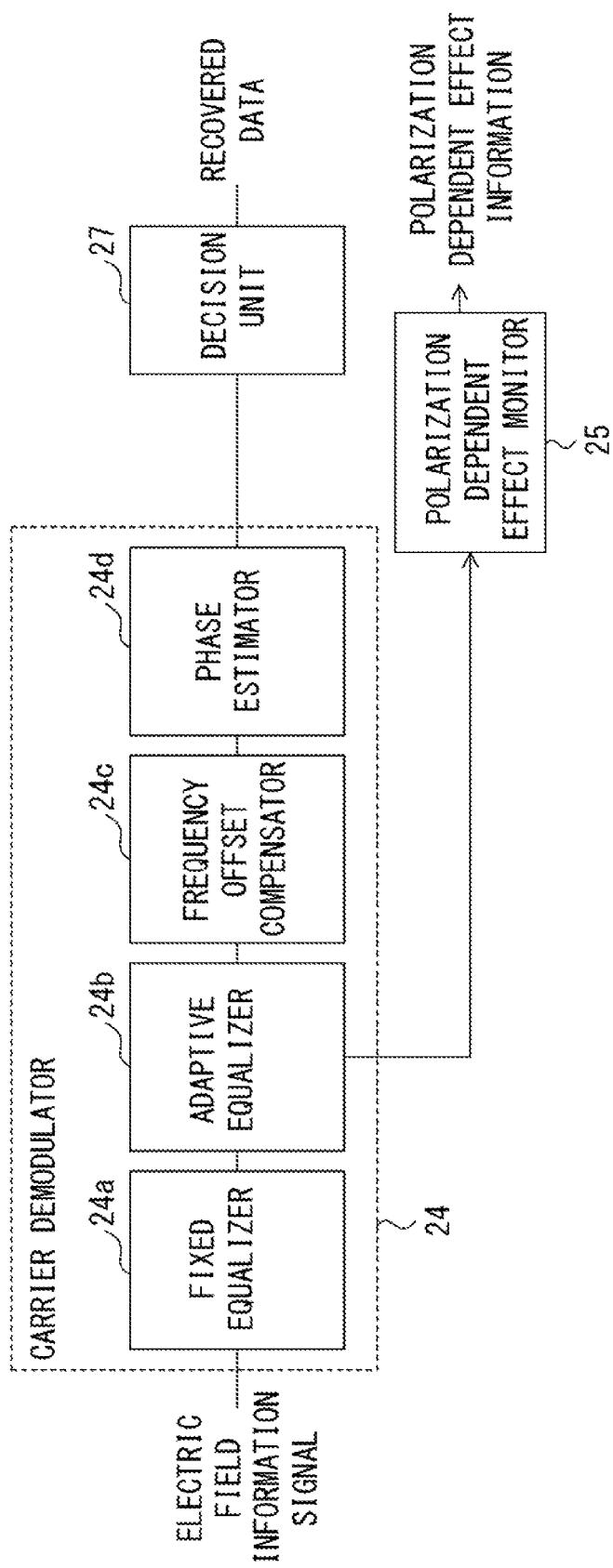
FIG. 9 illustrates another example of the carrier demodulator and the polarization-dependent effect monitor.

FIG. 9 illustrates another example of the carrier demodulator 24 and the polarization-dependent effect monitor 25. The carrier demodulator 24 is substantially the same in FIGS. 7 and 9.

The polarization-dependent effect monitor 25 illustrated in FIG. 9 detects polarization dependent effects on the polarization multiplexed optical signal according to the operating state of the adaptive equalizer 24b. Here the adaptive equalizer 24b is, for example, in a butterfly configuration that includes four digital filters. In this case, the polarization-dependent effect monitor 25 estimates polarization dependent effects (for example, the amount of PDL on the transmission line) from the coefficients of the digital filters, using the following formulae:

$W(f)=FFT(h(n))$ $T(f)=W(f)^+ W(f)$ $PDL=10\log(\lambda 1(f)/\lambda 2(f))$ h(n) represents the tap coefficients of the digital filters and W(f) represents a matrix obtained by performing Fourier transform on h(n). The operator+(superscript) transposes and inverts the matrix. The operator+may sometimes be denoted by H. λ1(f) and λ2(f) represent the eigenvalues of the matrix T(f).

The polarization-dependent effect monitor 25 outputs the above calculation results as polarization-dependent effect information. This polarization-dependent effect information is transmitted by the notification unit 26 to the optical transmitter 10. Meanwhile, a method of detecting polarization dependent effects using the tap coefficients of a digital filter is described, for example, in the following documents:

Md. Saifuddin Faruk, et al., Multi-Impairments Monitoring from the Equalizer in a Digital Coherent Optical Receiver, ECOC2010, paper Th.10.A.1, 2010

G. Bosco, et al., Joint DGD, PDL and Chromatic Dispersion Estimation in Ultra-Long-Haul WDM Transmission Experiments with Coherent Receivers, ECOC2010, paper Th.10.A.2, 2010

Thus, in the optical receiver 20, the polarization-dependent effect monitor 25 detects polarization dependent effects on received optical signals. The notification unit 26 transmits polarization-dependent effect information representing the polarization dependent effects detected by the polarization-dependent effect monitor 25 to the optical transmitter 10.

At the optical transmitter 10, the compensation controller 16 controls the correction of the electric-field information signal by the polarization-dependent effect compensator 15 based on the polarization-dependent effect information received from the optical receiver 20. Correction of the electric-field information signal is described below.

The polarization-dependent effect monitor 15 can correct, using the following formulae, the electric-field information signal generated by the constellation mapper 14 (constellation mappers 14x, 14y). Note that XI+jXQ is an x-polarization signal representing the electric field information of the data X. YI+jYQ is a y-polarization signal representing the electric field information of the data Y. XI'+jXQ' is the corrected x-polarization signal. YI'+jYQ' is the corrected y-polarization signal.

$$\begin{pmatrix} XI' + jXQ' \\ YI' + jYQ' \end{pmatrix} = aT_{\theta 11}T_{\epsilon 1}T_{\theta 12}T_{PDL1} \cdot T_{\theta 21}T_{\epsilon 2}T_{\theta 22}T_{PDL2} \ldots \begin{pmatrix} XI + jXQ \\ YI + jYQ \end{pmatrix}$$

Formula (1)

"a" is a real number. $T_\theta$ ($T_{\theta 11}$, $T_{\theta 12}$, $T_{\theta 21}$, $T_{\theta 22}$ ...) is a transfer function (rotation transformation operator) for controlling the mixing ratio of the x-polarization signal and the y-polarization signal and is represented by the following matrix:

$$T_\theta = \begin{pmatrix} \cos\theta & -\sin\theta \\ \sin\theta & \cos\theta \end{pmatrix}$$

$T_{PDL}$ ($T_{PDL1}$, $T_{PDL2}$ ...) is a transfer function (amplitude control operator) for controlling the amplitude of the x-polarization signal and the y-polarization signal and is represented by the following matrix:

$$T_{PDL} = \begin{pmatrix} 10^{\frac{PDL}{2*20}} & 0 \\ 0 & 10^{\frac{-PDL}{2*20}} \end{pmatrix}$$

$T_\epsilon$ ($T_{\epsilon 1}$, $T_{\epsilon 2}$ ...) is a transfer function (phase shift operator) for controlling the phases of the x-polarization signal and the y-polarization signal and is represented by the following matrix:

$$T_\varepsilon = \begin{pmatrix} \exp(i\varepsilon/2) & 0 \\ 0 & \exp(-i\varepsilon/2) \end{pmatrix}$$

The transfer function $T_\theta$ rotates polarizations by $\theta$ as illustrated in FIG. 10A. Thus, when the transfer function $T_\theta$ is applied to an electric-field information signal, the electric field information Ex of data superimposed on one polarization and the electric field information Ey of data superimposed on the other polarization are mixed. The mixing ratio of Ex and Ey depends on $\theta$. That is, the Tx digital signal processor 11 can vary the mixing ratio of Ex and Ey by controlling the parameter $\theta$ using the compensation controller 16.

As illustrated in FIG. 10B, the transfer function $T_{PDL}$ controls individually the amplitude of the electric field information Ex of the data superimposed on one polarization and the amplitude of the electric field information Ey of the data superimposed on the other polarization. In the example illustrated in FIG. 10B, Ex is increased while Ey is reduced. That is, the Tx digital signal processor 11 can vary the ratio of the amplitude of Ex and Ey by controlling the parameter PDL using the compensation controller 16. The parameter PDL is a real number.

Although not illustrated, the transfer function $T_\varepsilon$ controls individually the phase of the electric field information Ex of the data superimposed on one polarization and the phase of the electric field information Ey of the data superimposed on the other polarization. The Tx digital signal processor 11 can vary the phase difference between Ex and Ey by controlling the parameter $\varepsilon$ using the compensation controller 16.

The polarization-dependent effect compensator 15 corrects the electric-field information signal using formula (1) according to the control of the compensation controller 16. Formula (1) is a general formula, and the polarization-dependent effect compensator 15 may correct the electric-field information signal using one or a plurality of transfer functions. That is, the polarization-dependent effect compensator 15 may correct the electric-field information signal using at least one of rotation transformation, amplitude control and phase shift. For example, the polarization-dependent effect compensator 15 may correct the electric-field information signal using only the transfer function $T_\theta$, as described below.

$$\begin{pmatrix} XI' + jXQ' \\ YI' + jYQ' \end{pmatrix} = T_\theta \begin{pmatrix} XI + jXQ \\ YI + jYQ \end{pmatrix}$$

Also, the polarization-dependent effect compensator 15 may correct the electric-field information signal using only the transfer function $T_{PDL}$, as described below.

$$\begin{pmatrix} XI' + jXQ' \\ YI' + jYQ' \end{pmatrix} = T_{PDL} \begin{pmatrix} XI + jXQ \\ YI + jYQ \end{pmatrix}$$

Alternatively, the polarization-dependent effect compensator 15 may correct the electric-field information signal using only the real number "a", as described below.

$$\begin{pmatrix} XI' + jXQ' \\ YI' + jYQ' \end{pmatrix} = a \begin{pmatrix} XI + jXQ \\ YI + jYQ \end{pmatrix}$$

Figure 11:
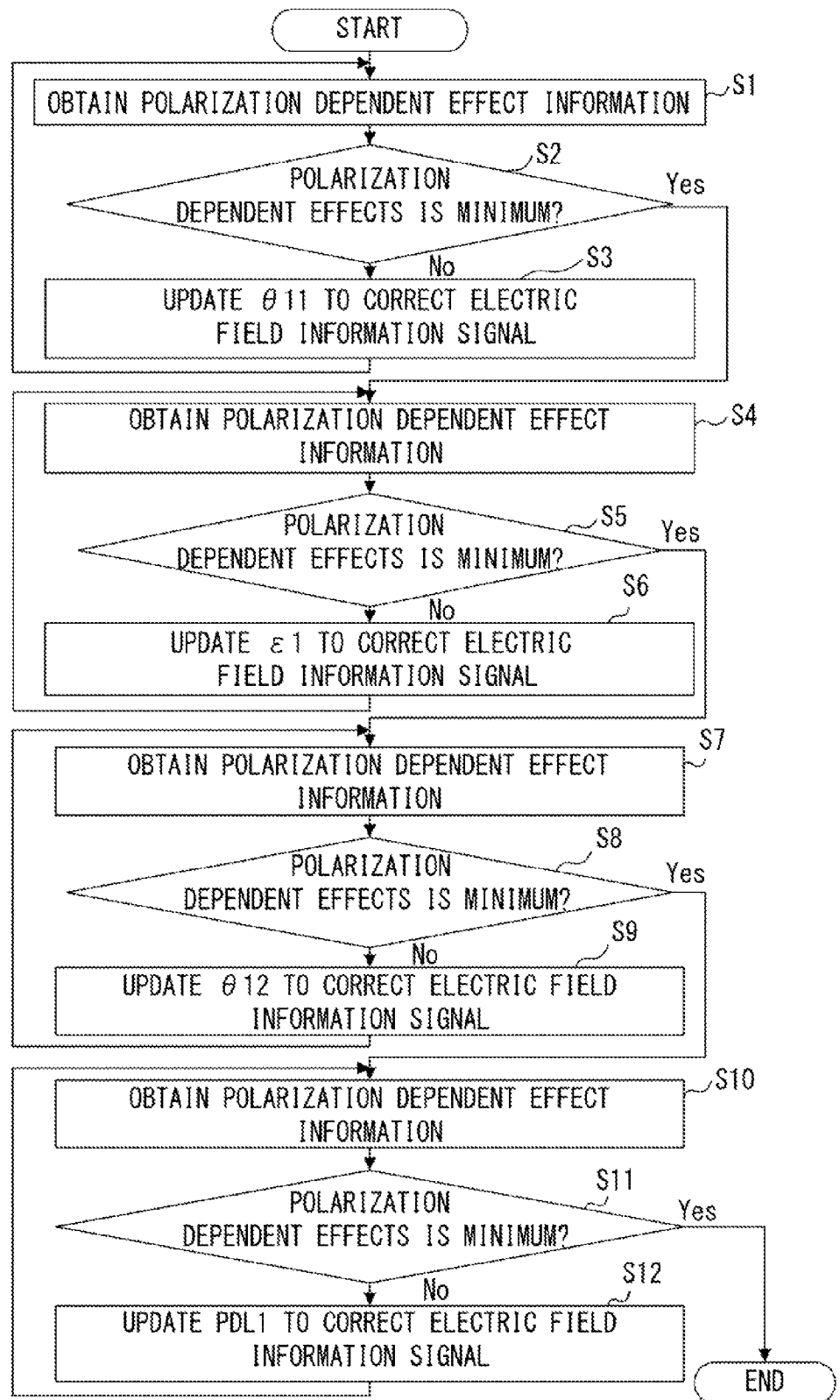
FIG. 11 is a flowchart illustrating a process for correcting an electric-field information signal.

FIG. 11 is a flowchart illuminating a process for correcting the electric-field information signal. The process in the flowchart is executed by the Tx digital signal processor 11 (compensation controller 16 and polarization-dependent effect compensator 15). In this example, the electric-field information signal is corrected by the following transfer function:

Transfer function = $T_{\theta 11} T_{\varepsilon 1} T_{\theta 12} T_{PDL1}$

In S1, the compensation controller 16 obtains polarization-dependent effect information. The polarization-dependent effect information is generated by the polarization-dependent effect monitor 25 in the optical receiver 20.

In S2, the compensation controller 16 decides whether or not the polarization dependent effects represented by the polarization-dependent effect information have been minimized. This minimization will be described later. If the polarization dependent effects have not been minimized, the process of the Tx digital signal processor 11 moves on to S3.

In S3, the Tx digital signal processor 11 corrects the electric-field information signal based on the polarization-dependent effect information. At this time the compensation controller 16 controls $\theta 11$ in such a way as to reduce the polarization dependent effects. Also, the polarization-dependent effect compensator 15 corrects the electric-field information signal with the transfer function $T_{\theta 11}$ corresponding to $\theta 11$ controlled by the compensation controller 16. Thereafter, the process of the Tx digital signal processors 11 returns to S1.

In this way, the Tx digital signal processor 11 repeatedly executes S1 to S3 until the polarization dependent effects are minimized. Once the polarization dependent effects are minimized, the process of the Tx digital signal processor 11 goes to S4. The minimization in S2 means that the polarization dependent effects are minimized or approximately minimized by controlling the parameter $\theta 11$.

In S4 to S6, the Tx digital signal processor 11 executes processes similar to S1 to S3. In S4 to S6, however, the compensation controller 16 controls $\varepsilon 1$ in such a way as to reduce the polarization dependent effects. The polarization-dependent effect compensator 15 corrects the electric-field information signal with the transfer function $T_{\varepsilon 1}$ corresponding to $\varepsilon 1$ controlled by the compensation controller 16.

The Tx digital signal processor 11 repeatedly executes S4 to S6 until the polarization dependent effects are minimized. Once the polarization dependent effects are minimized, the process of the Tx digital signal processor 11 goes to S7. The minimization in S5 means that the polarization dependent effects are minimized or approximately minimized by controlling the parameter $\varepsilon 1$.

In S7 to S9, the Tx digital signal processor 11 executes processes similar to S1 to S3. In S7 to S9, however, the compensation controller 16 controls $\theta 12$ in such a way as to reduce the polarization dependent effects. The polarization-dependent effect compensator 15 corrects the electric-field information signal with the transfer function $T_{\theta 12}$ corresponding to $\theta 12$ controlled by the compensation controller 16.

The Tx digital signal processor 11 repeatedly executes S7 to S9 until the polarization dependent effects are minimized. Once the polarization dependent effects are minimized, the process of the Tx digital signal processor 11 goes to S10. The minimization in S8 means that the polarization dependent effects are minimized or approximately minimized by controlling the parameter $\theta 12$.

In S10 to S12, the Tx digital signal processor 11 executes processes similar to S1 to S3. In S10 to S12, however, the compensation controller 16 controls the parameter PDL1 in such a way as to reduce the polarization-dependent effect information. The polarization-dependent effect compensator 15 corrects the electric-field information signal with the transfer function $T_{PDL1}$ corresponding to the parameter PDL controlled by the compensation controller 16.

The Tx digital signal processor 11 repeatedly executes S10 to S12 until the polarization dependent effects are minimized or approximately minimized. Once the polarization dependent effects are minimized, the process of the Tx digital signal processor 11 ends. The minimization in S11 may mean that the polarization dependent effects become smaller than a specified threshold.

Thus, in the example illustrated in FIG. 11, the Tx digital signal processor 11 minimizes or approximately minimizes the polarization dependent effects while controlling the parameters (i.e., the transfer functions) one at a time in order. However, the procedure for reducing the polarization dependent effects is not limited to the order described in FIG. 11. That is, the Tx digital signal processor 11 may execute S1 to S3, S4 to S6, S7 to S9, and S10 to S12 in any order. Also, the Tx digital signal processor 11 may reduce the polarization dependent effects while controlling the parameters using other methods.

In setting parameters $\theta 11$, $\epsilon 1$, $\theta 12$, PDL1, in order to control the minimization of the polarization dependent effects more stably, the parameters may be dithered.

As described above, the optical transmission system 1 according to the first embodiment suppresses the polarization dependent effects by correcting the electric-field information signal through feedback control. That is, degradation of the characteristics of polarization multiplexed optical signals due to polarization dependent loss is suppressed. Further, even in an environment where polarization dependent loss and waveform distortion due to nonlinear effects coexist, performing the above feedback control ensures that the polarization dependent effects are sufficiently suppressed to provide desirable reception performance.

Meanwhile, in the above example, the polarization-dependent effect information is sent from the optical receiver 20 to the optical transmitter 10, and new parameters are calculated at the optical receiver 10. The invention, however, is not limited to this configuration. For example, the parameters may be updated at the optical receiver 20 according to the polarization-dependent effect information and the new parameters may be sent from the optical receiver 20 to the optical transmitter 10. In this case, the optical transmitter 10 corrects the electric-field information signal using the parameters received from the optical receiver 20.

Second Embodiment

Figure 12:
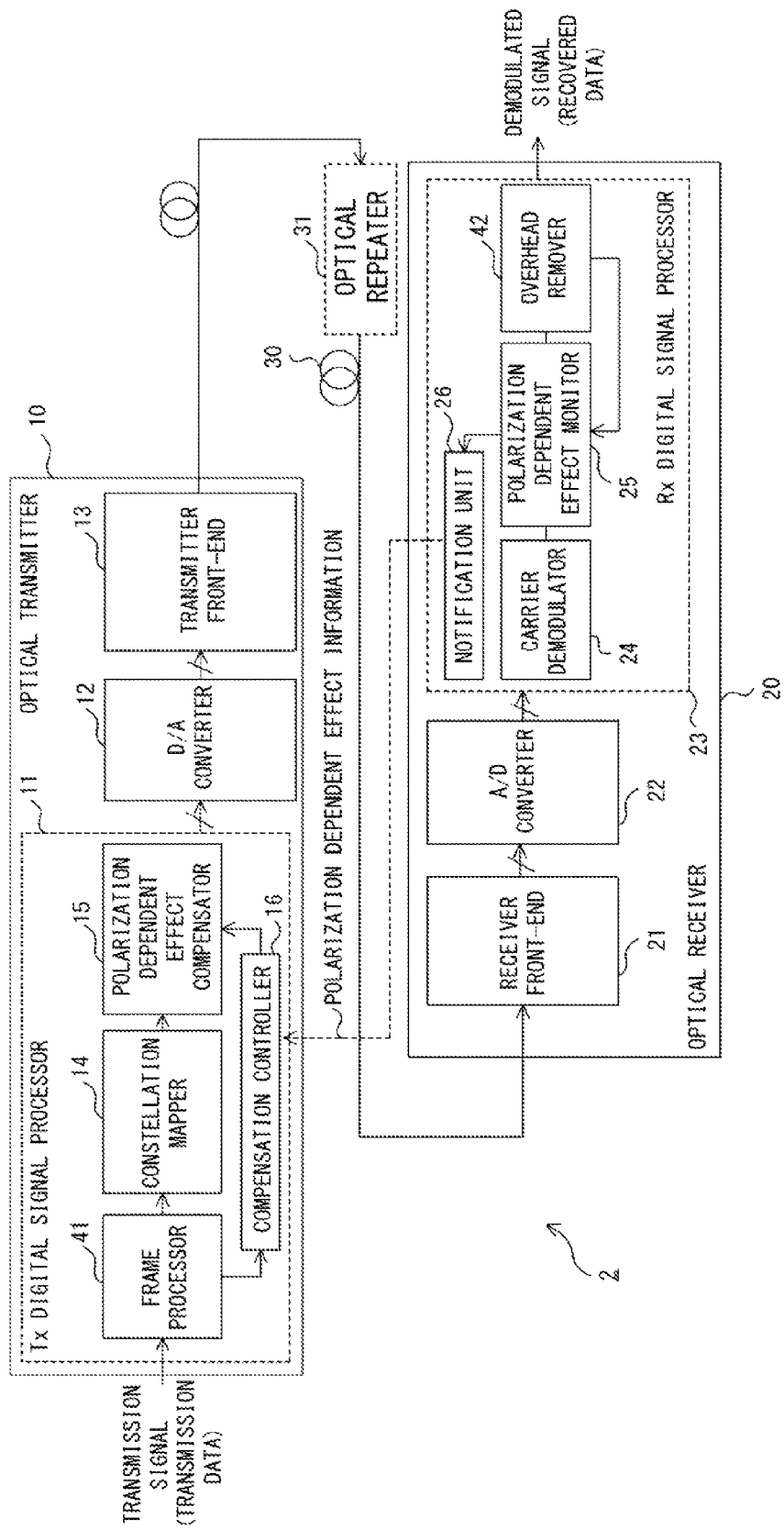
FIG. 12 illustrates the configuration of the optical transmission system according to the second embodiment.

FIG. 12 illustrates the configuration of the optical transmission system according to the second embodiment. Similar to the first embodiment, the optical transmission system 2 according to the second embodiment includes an optical transmitter 10 and an optical receiver 20. In addition, similar to the first embodiment, an optical transmission line 30 is provided between the optical transmitter 10 and the optical receiver 20.

Similar to the first embodiment, the optical transmitter 10 according to the second embodiment includes a Tx digital signal processor 11, a D/A converter 12, and a transmitter front-end 13. The Tx digital signal processor 11 according to the second embodiment, however, includes a constellation mapper 14, a polarization-dependent effect compensator 15, a compensation controller 16, and a frame processor 41.

The frame processor 41 generates a frame for transmitting data via the optical transmission line 30. The frame generated by the frame processor 41 includes, for example, an overhead and a payload, as illustrated in FIG. 13.

Figure 13:
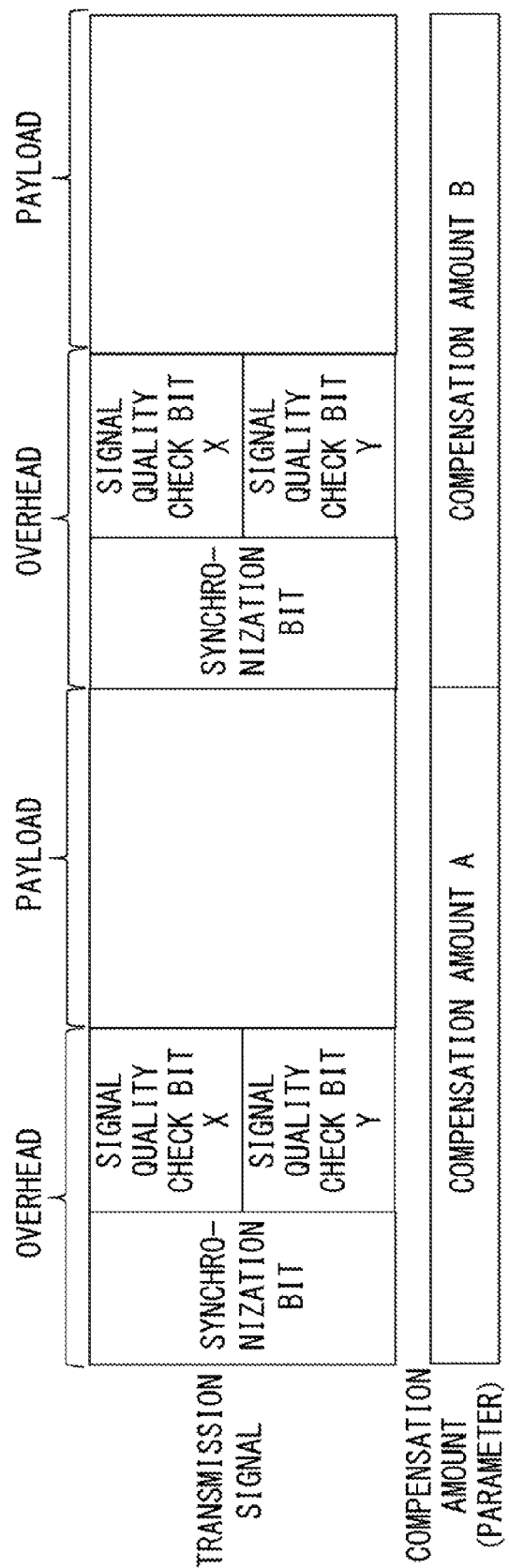
FIG. 13 illustrates an example of the structure of a frame used in the second embodiment.

In the example illustrated in FIG. 13, the overhead includes a synchronization bit, a signal quality check bit X, and a signal quality check bit Y. The synchronization bit is used in the optical receiver 20 to detect a frame. The signal quality check bits X and Y are implemented by respective bit sequences with specified patterns. The signal quality check bits X and Y may be bit sequences of the same pattern or bit sequences of different patterns. Also, the overhead portion may be provided with a teacher signal or the like for supervisory control or for use in a received signal processor.

The transmission data are stored in the payload. That is, the frame processor 41 converts the transmission data into segments at every specified length and stores each segment in the payload of a frame. The frame processor 41 outputs the frames in order, the frames each including the overhead and the payload described above.

The frame data output from the frame processor 41 are parallelized by the parallelizer 17 illustrated in FIG. 3 and are guided to the constellation mappers 14*x* and 14*y*. The signal quality check bit X is guided to the constellation mapper 14*x* and the signal quality check bit Y is guided to the constellation mapper 14*y*. That is, the signal quality check bit X is transmitted using x-polarization, while the signal quality check bit Y is transmitted using y-polarization.

The constellation mapper 14, the polarization-dependent effect compensator 15, and the compensation controller 16 operate in substantially the same way as the first embodiment. In the second embodiment, however, the compensation controller 16 updates compensation amounts (parameters $\theta$, $\epsilon$, PDL, a) in synchronization with frame periods. In the example illustrated in FIG. 13, a compensation amount A is given to the first frame and a compensation amount B is given to the second frame. The polarization-dependent effect compensator 15 corrects the electric-field information signal according to the compensation amount instructed from the compensation controller 16.

Similar to the first embodiment, the optical receiver 20 according to the second embodiment includes a receiver front-end 21, an A/D converter 22, and an Rx digital signal processor 23. However, the Rx digital signal processor 23 according to the second embodiment includes a carrier demodulator 24, a polarization-dependent effect monitor 25, a notification unit 26, and an overhead remover 42.

The overhead remover 42 reconfigures frames from recovered data sequences. That is, the frames illustrated in FIG. 13 are reproduced. At this time the overhead remover 42 may establish frame synchronization by using the synchronization bit illustrated in FIG. 13. The overhead remover 42 extracts the overhead from the reconfigured frame.

The overhead remover 42 gives the overhead extracted from the reconfigured frame to the polarization-dependent effect monitor 25. The polarization-dependent effect monitor 25 detects polarization dependent effects on the received polarization multiplexed optical signal based on the given overhead data. The notification unit 26 sends to the optical transmitter 10 the polarization-dependent effect information representing the polarization dependent effects detected by the polarization-dependent effect monitor 25. The data (i.e., data stored in the payload) obtained by removing the overhead from the frame are output as recovered transmission data.

FIG. 14 illustrates an example of the carrier demodulator 24 and the polarization-dependent effect monitor 25 according to the second embodiment. The carrier demodulator 24 and the decision unit 27 are substantially the same in FIG. 7 and FIG. 14. That is, the carrier demodulator 24 demodulates received optical signals. The decision unit 27 recovers data sequence from the demodulated signal obtained by the carrier demodulator 24.

The overhead remover 24 reconfigures a frame from the data sequence recovered by the decision unit 27, and extracts the overhead from the frame. The overhead remover 24 gives the overhead extracted from the frame to the polarization-dependent effect monitor 25.

In the second embodiment, the polarization-dependent effect monitor 25 detects a bit error rate of each of the signal quality check bits X and Y stored in the overhead of the frame. The bit error rate BER(X) of the signal quality check bit X represents the transmission quality of x-polarization. The bit error rate BER(Y) of the signal quality check bit Y represents the transmission quality of y-polarization. Therefore, the ratio of the bit error rate BER(X) to the bit error rate BER(Y) represents degradations due to polarization dependent loss.

The polarization-dependent effect monitor 25 outputs the ratio of the bit error rate BER(X) to the bit error rate BER(Y) as polarization-dependent effect information representing polarization dependent effects. The polarization-dependent effect monitor 25 calculates the ratio of BER(X) to BER(Y) for every frame and outputs the polarization-dependent effect information. The notification unit 26 transmits the polarization-dependent effect information to the optical transmitter 10 for every frame. Further, the optical transmitter 10 corrects the electric-field information signal in synchronization with the frame periods according to the polarization-dependent effect information received from the notification unit 26.

Thus, in the second embodiment, a transfer function for correcting the electric-field information signal is updated in synchronization with the period of the frame for transmitting data via the optical transmission line 30. Therefore, an optimum transfer function for suppressing degradation of characteristics due to the polarization dependent loss can be obtained stably and rapidly. For example, fast startup of the optical transmission system 2 is enabled by sweeping the compensation amounts (parameters θ, ε, PDL, a) in synchronization with the frame periods.

In the above example, polarization dependent effects are detected using the signal quality check bits X and Y in the frame illustrated in FIG. 13, but the second embodiment is not limited to this configuration. For example, if the data X and the data Y are stored in each frame and FEC (Forward Error Correction) codes are added to the data X and the data Y, the polarization-dependent effect monitor 25 obtains the numbers of error corrections of the data X and the data Y. Then the polarization-dependent effect monitor 25 may generate polarization-dependent effect information based on the ratio of the number of error corrections of the data X to that of error corrections of the data Y. In this case, the optical transmission system 2 may employ a general frame structure (e.g., OUT frame).

Third Embodiment

Figure 15:
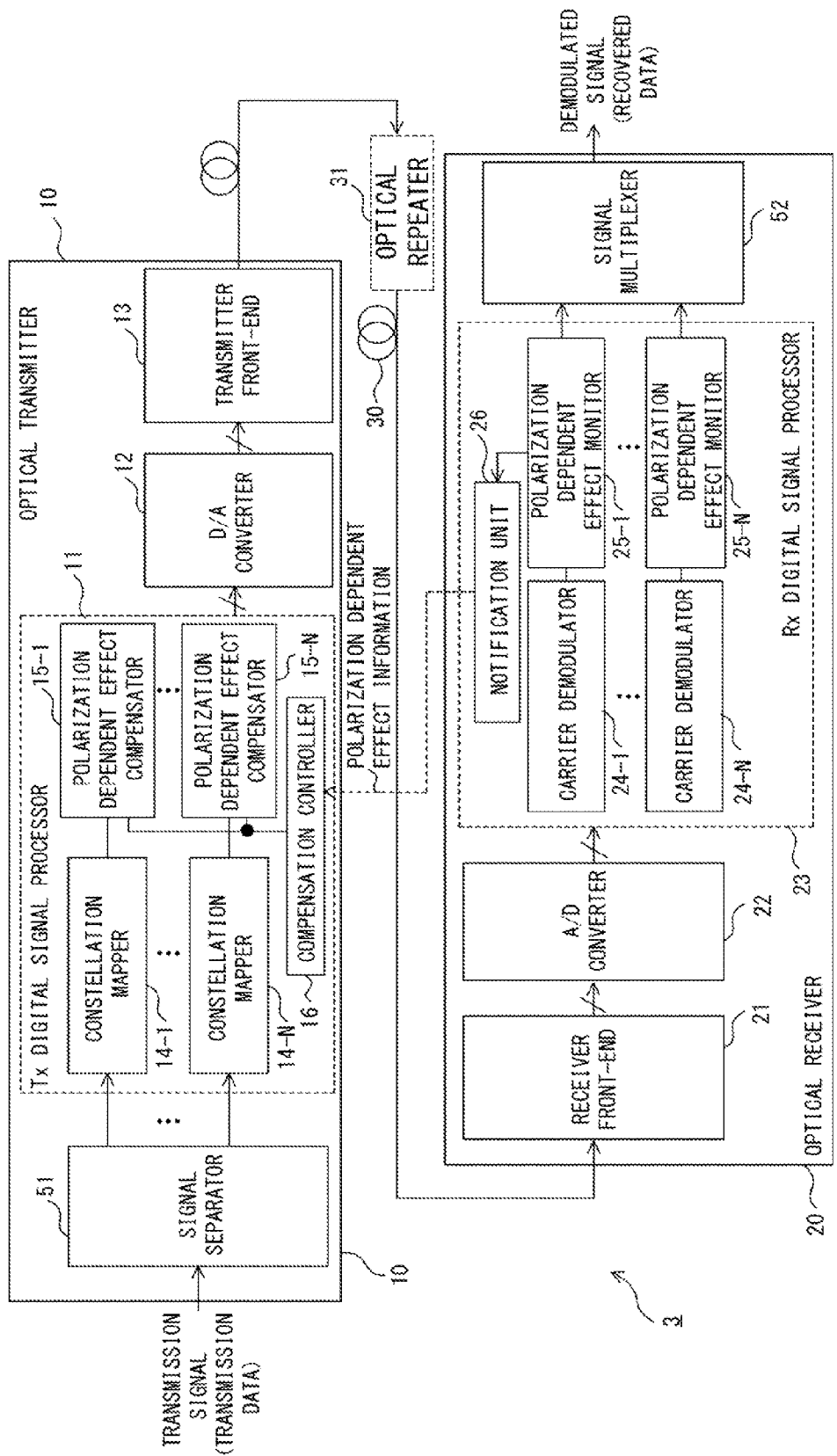
FIG. 15 illustrates the configuration of the optical transmission system according to the third embodiment.

FIG. 15 illustrates the configuration of the optical transmission system according to the third embodiment. Similar to the first embodiment, the optical transmission system 3 according to the third embodiment includes an optical transmitter 10 and an optical receiver 20. Similar to the first embodiment, an optical transmission line 30 is provided between the optical transmitter 10 and the optical receiver 20. The optical transmission system 3, however, can transmit a plurality of polarization multiplexed optical signals by using a plurality of carriers or subcarriers.

The optical transmitter 10 according to the third embodiment includes a Tx digital signal processor 11, a D/A converter 12, a transmitter front-end 13, and a signal separator 51. The signal separator 51 separates input data into a plurality of data sequences 1 to N. The bit rates of the data sequences 1 to N may be the same or different. In the third embodiment, N is an integer of 2 or more.

The Tx digital signal processor 11 according to the third embodiment includes a plurality of constellation mappers 14-1 to 14-N, a plurality of polarization-dependent effect compensators 15-1 to 15-N, and a compensation controller 16. The data sequences 1 to N are input respectively to the constellation mappers 14-1 to 14-N. The constellation mappers 14-1 to 14-N generate respective electric-field information signals 1 to N corresponding to the data sequences 1 to N. Each of the electric-field information signals 1 to N includes XI, XQ, YI and YQ, as illustrated in FIG. 3. The polarization-dependent effect compensators 15-1 to 15-N respectively correct the electric-field information signals 1 to N according to instructions given from the compensation controller 16. The compensation controller 16 controls the polarization-dependent effect compensators 15-1 to 15-N based on the polarization-dependent effect information generated by the optical receiver 20.

The constellation mappers 14-1 to 14-N operate in substantially the same way as the constellation mapper 14 of the first or second embodiment. Also, the polarization-dependent effect compensators 15-1 to 15-N operate in substantially the same way as the polarization-dependent effect compensator 15 of the first or second embodiment.

The D/A converter 12 converts the electric-field information signals 1 to N generated by the Tx digital signal processor 11 into analog signals by using a plurality of D/A converters. Alternatively, the D/A converter 12 may frequency-multiplex digital signals representing the electric-field information signals 1 to N, and convert the multiplexed digital signals into analog signals using one D/A converter. In addition, the electric-field information signals 1 to N are corrected by the respective polarization-dependent effect compensators 15-1 to 15-N based on the corresponding polarization-dependent effect information.

The transmitter front-end 13 generates an optical signal from output signals of the D/A converter 12. For example, polarization multiplexed optical signals 1 to N are generated using signals output from the D/A converters corresponding to the respective electric-field information signals 1 to N. In this case, the polarization multiplexed optical signals 1 to N have different carrier frequencies, and the transmitter front-end 13 combines the polarization multiplexed optical signals 1 to N for output to the optical transmission line 30. Alternatively, the transmitter front-end 13 may transmit the signals using a plurality of subcarriers. In this case, the polarization multiplexed optical signals may be transmitted by the respective subcarriers.

The optical transmitter 20 according to the third embodiment includes a receiver front-end 21, an A/D converter 22, an Rx digital signal processor 23, and a signal multiplexer 52. The receiver front-end 21 generates electric signals representing received optical signals. The A/D converter 22 converts output signals of the receiver front-end 21 into digital signals.

The Rx digital signal processor 23 according to the third embodiment includes a plurality of carrier demodulators 24-1 to 24-N, a plurality of polarization-dependent effect monitors 25-1 to 25-N, and a notification unit 26. The carrier demodulators 24-1 to 24-N demodulate the respective polarization multiplexed optical signals 1 to N according to the electric signals output from the A/D converter 22, and output the demodulated signals 1 to N. The polarization-dependent effect monitors 25-1 to 25-N respectively detect polarization dependent effects of the demodulated multiplexed optical signals 1 to N based on the demodulated signals 1 to N. The polarization-dependent effect monitors 25-1 to 25-N respectively output polarization-dependent effect information 1 to N representing the polarization dependent effects on the modulated multiplexed optical signals 1 to N. The notification unit 26 transmits the polarization-dependent effect information 1 to N generated by the polarization-dependent effect monitors 25-1 to 25-N to the optical transmitter 10.

The signal multiplexer 52 recovers the data sequences 1 to N from the demodulated signals 1 to N output from the Rx digital signal processor 23. The signal multiplexer 52 outputs recovered transmission data by multiplexing the data sequences 1 to N.

Thus, the optical transmission system 3 according to the third embodiment can transmit a plurality of polarization multiplexed optical signals 1 to N by using a plurality of carriers or a plurality of subcarriers. However, polarization dependent effects vary according to the wavelength of the carriers. Therefore, in the third embodiment, the optical transmitter 20 detects polarization dependent effects for each of the carriers or each of the subcarriers. The polarization-dependent effect information 1 to N representing the polarization dependent effects on the respective carriers or subcarriers are transmitted from the optical receiver 20 to the optical transmitter 10.

The optical transmitter 10 corrects the electric-field information signals 1 to N based on the polarization-dependent effect information 1 to N, and generates optical signals from the corrected electric-field information signals 1 to N. For example, the polarization-dependent effect compensator 15-1 corrects the electric-field information signal 1 for generating the polarization multiplexed optical signal 1, in such a way as to suppress the polarization dependent effects represented by the polarization-dependent effect information of the polarization multiplexed optical signal 1. Similarly, the polarization-dependent effect compensator 15-N corrects the electric-field information signal N for generating the polarization multiplexed optical signal N, in such a way as to suppress the polarization dependent effects represented by the polarization-dependent effect information of the polarization multiplexed optical signal N. Thus, even if the polarization multiplexed optical signals 1 to N have different carrier frequencies, the polarization dependent effects on the polarization multiplexed signals 1 to N are properly suppressed.

Thus, in the third embodiment, the polarization dependent effects are compensated for or suppressed for every carrier or subcarrier. That is, the wavelength dependence (higher-order polarization dependent effect) of the polarization dependent effects is mitigated. Therefore, in a system for transmitting a plurality of polarization multiplexed optical signals using a plurality of carriers or subcarriers, the transmission quality of each polarization multiplexed optical signal is improved.

In the above configuration, the Tx digital signal processor 11 may correct the plurality of electric-field information signals 1 to N at substantially the same time. In this case, the characteristics of the plurality of polarization multiplexed optical signals may be improved in a short time. Also, the Tx digital signal processor 11 may correct at least some of the plurality of electric-field information signals 1 to N at different timing. That is, the Tx digital signal processor 11 may correct the plurality of electric-field information signals 1 to N in time division multiplexing (or at a random timing). In this case, the influence of the polarization dependent loss on the entire transmission system is mitigated.

Figure 16A:
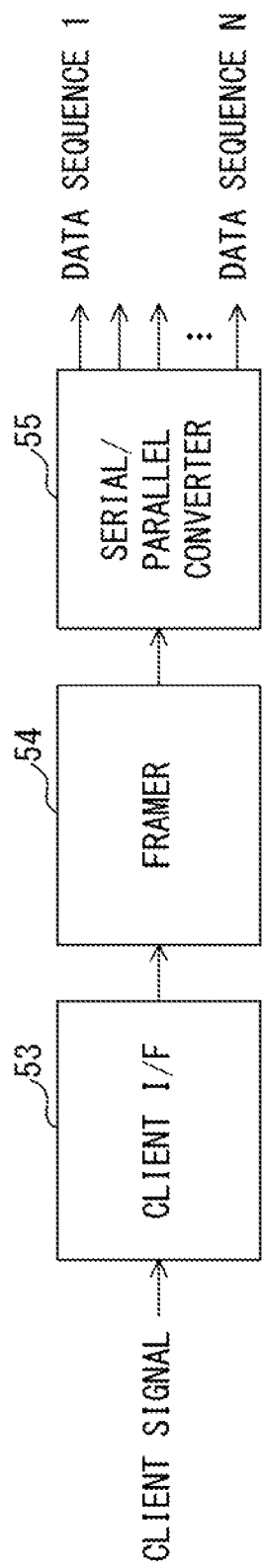
FIGS. 16A and 16B illustrate configurations for receiving a signal from a client.

The optical transmitter 10 can generate a plurality of polarization multiplexed optical signals 1 to N from one input signal, as illustrated in FIG. 15. It is assumed that the input signal is a client signal generated by one client. In this case, the signal separator 51 includes a client interface 53, a framer 54, and a serial/parallel converter 55, as illustrated in FIG. 16A. The client interface 53 terminates the client signal. From the client signal, the framer 54 generates a frame that can be transmitted through the optical transmission line 30. The serial/parallel converter 55 generates N data sequences by parallelizing frame data. The N data sequences are guided to the constellation mappers 14-1 to 14-N illustrated in FIG. 15.

Figure 16B:
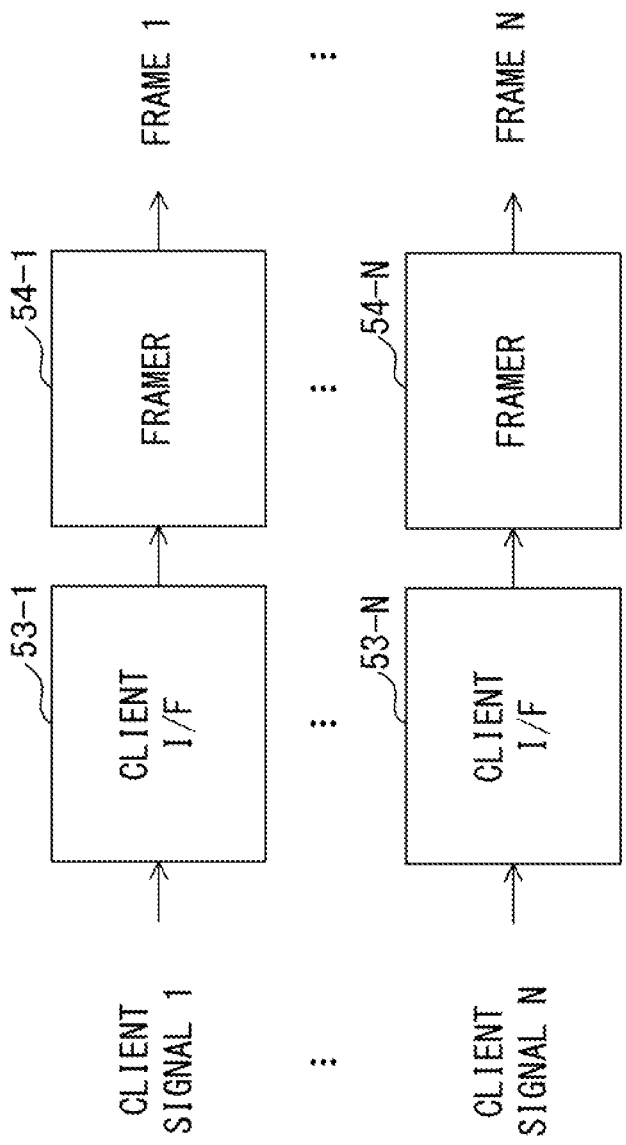

The optical transmitter 10 may terminate a plurality of client signals. In this case, the optical transmitter 10 includes client interfaces 53-1 to 53-N and framers 54-1 to 54-N illustrated in FIG. 16B, in place of the signal separator 51. The client interfaces 53-1 to 53-N respectively terminate client signals 1 to N generated by corresponding clients. The framers 54-1 to 54-N respectively generate frames 1 to N that can be transmitted through the optical transmission line 30 from the corresponding client signals 1 to N. The frames 1 to N are guided to the respective constellation mappers 14-1 to 14-N illustrated in FIG. 15.

The optical receiver 20 can generate a client signal from a plurality of polarization multiplexed optical signals 1 to N, as illustrated in FIG. 15. In this case, the signal multiplexer 52 includes a parallel/serial converter 56, a framer 57, and a client interface 58, as illustrated in FIG. 17A. The parallel/serial converter 56 converts the data sequences 1 to N recovered by the Rx digital signal processor 23 into one data sequence. The framer 57 generates a frame that can be transmitted through a client line from the data sequence output from the parallel/serial converter 56. The client interface 58 transmits the frame generated by the framer 57 to a client.

The optical receiver 20 may transmit data to a plurality of clients. In this case, the optical transmitter 20 includes, in place of the signal multiplexer 52, framers 57-1 to 57-N and client interfaces 58-1 to 58-N illustrated in FIG. 17B. The framers 57-1 to 57-N respectively generate frames 1 to N that can be transmitted through the client lines from the data sequences 1 to N recovered by the Rx digital signal processor 23. The client interfaces 58-1 to 58-N respectively transmit the frames 1 to N to corresponding clients.

FIG. 18A illustrates an example of the configuration of the optical transmitter according to the third embodiment. In the example illustrated in FIG. 18A, the optical transmitter includes Nyquist filters 61-1 to 61-N with different characteristics for different carriers as necessary. The Nyquist filters 61-1 to 61-N are implemented, for example, by digital signal processing. In this case, the Nyquist filters 61-1 to 61-N respectively filter the electric-field information signals 1 to N output from the polarization-dependent effect compensators 15-1 to 15-N. This filtering may be implemented in an optical domain. In this case, the Nyquist filters 61-1 to 61-N respectively filter the optical signals generated by the transmitter front-ends 13-1 to 13-N. Additionally, the optical combiner 62 may be implemented, for example, by an optical coupler or an optical filter.

Figure 18B:
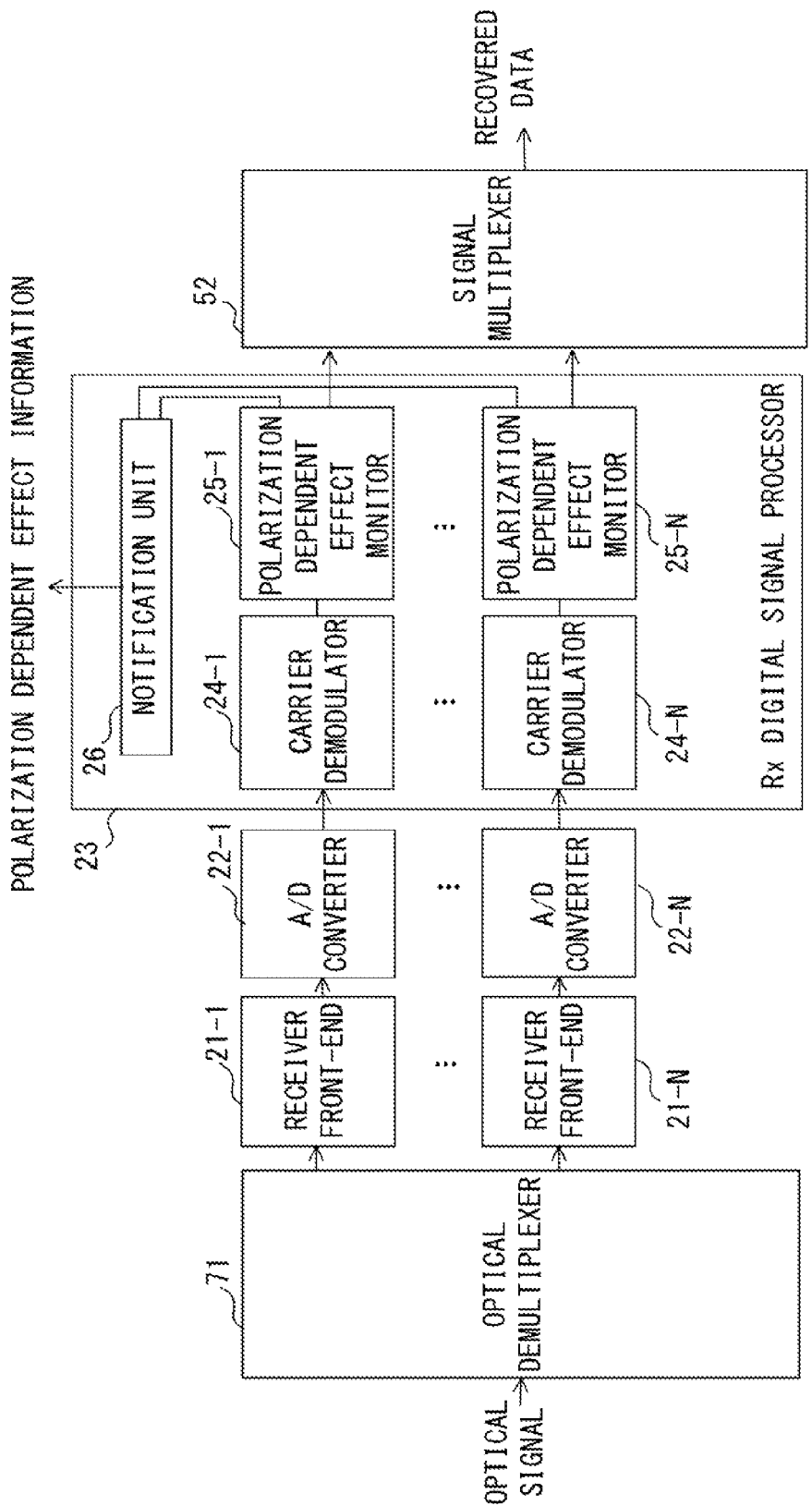
FIG. 18B illustrates an example of the configuration of the optical receiver corresponding to the optical transmitter illustrated in FIG. 18A.

FIG. 18B illustrates an example of the configuration of the optical receiver corresponding to the optical transmitter illustrated in FIG. 18A. In the example illustrated in FIG. 18B, the optical demultiplexer 71 splits the received optical signal with respect to carrier frequency (i.e., wavelength). The optical signals 1 to N output from the optical demultiplexer 71 are guided to the receiver front-ends 21-1 to 21-N. The receiver front-ends 21-1 to 21-N respectively generate electric signals 1 to N representing the electric field information of the optical signals 1 to N. The Rx digital signal processor 23 detects the polarization dependent effects on the polarization multiplexed optical signals according to the electric signals 1 to N. Note that the optical demultiplexer 71 may be implemented, for example, by an optical coupler or an optical filter.

Figure 19A:
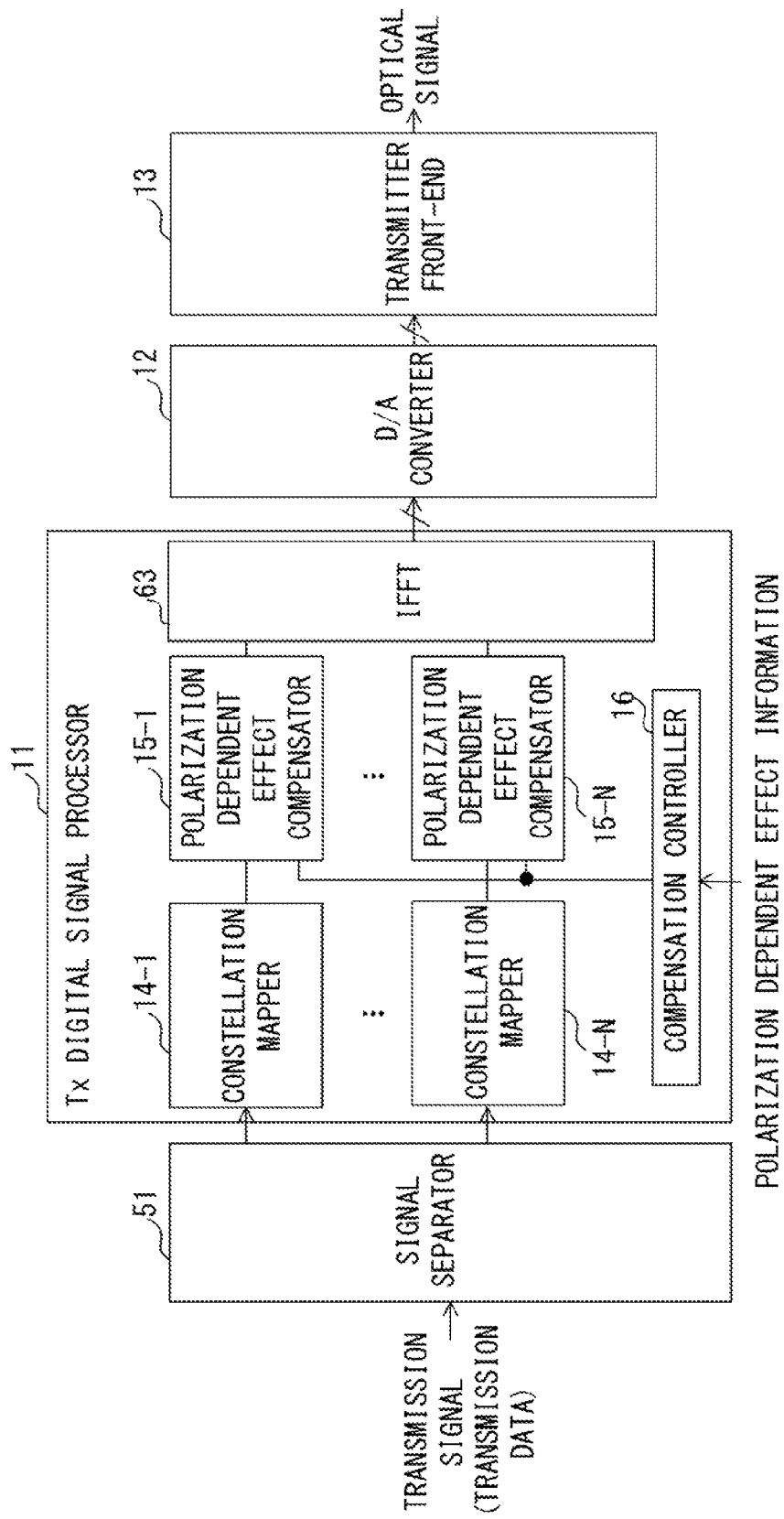
FIG. 19A illustrates another example of the configuration of the optical transmitter according to the third embodiment.

FIG. 19A illustrates another example of the configuration of the optical transmitter according to the third embodiment. In the example illustrated in FIG. 19A, the Tx digital signal processor 11 includes an IFFT (Inverse Fast Fourier Transform) unit 63. The IFFT unit 63 converts the electric-field information signals 1 to N output from the polarization-dependent effect compensators 15-1 to 15-N into time domain signals. The transmitter front-end 13 generates an optical signal from the time domain signals and outputs the optical signal to the optical transmission line 30. The optical signal includes a plurality of subcarriers.

FIG. 19B illustrates an example of the configuration of the optical receiver corresponding to the optical transmitter illustrated in FIG. 19A. In the example illustrated in FIG. 19B, the Rx digital signal processor 23 includes an FFT (Fast Fourier Transform) unit 72. The FFT unit 72 converts a signal representing the electric field information of the received optical signal into a frequency domain signals. That is, the received signals are separated for each subcarrier. The Rx digital signal processor 23 detects the polarization dependent effects on the corresponding polarization multiplexed optical signal based on the demodulated signals of the subcarriers obtained by the FFT unit 72.

Figure 20A:
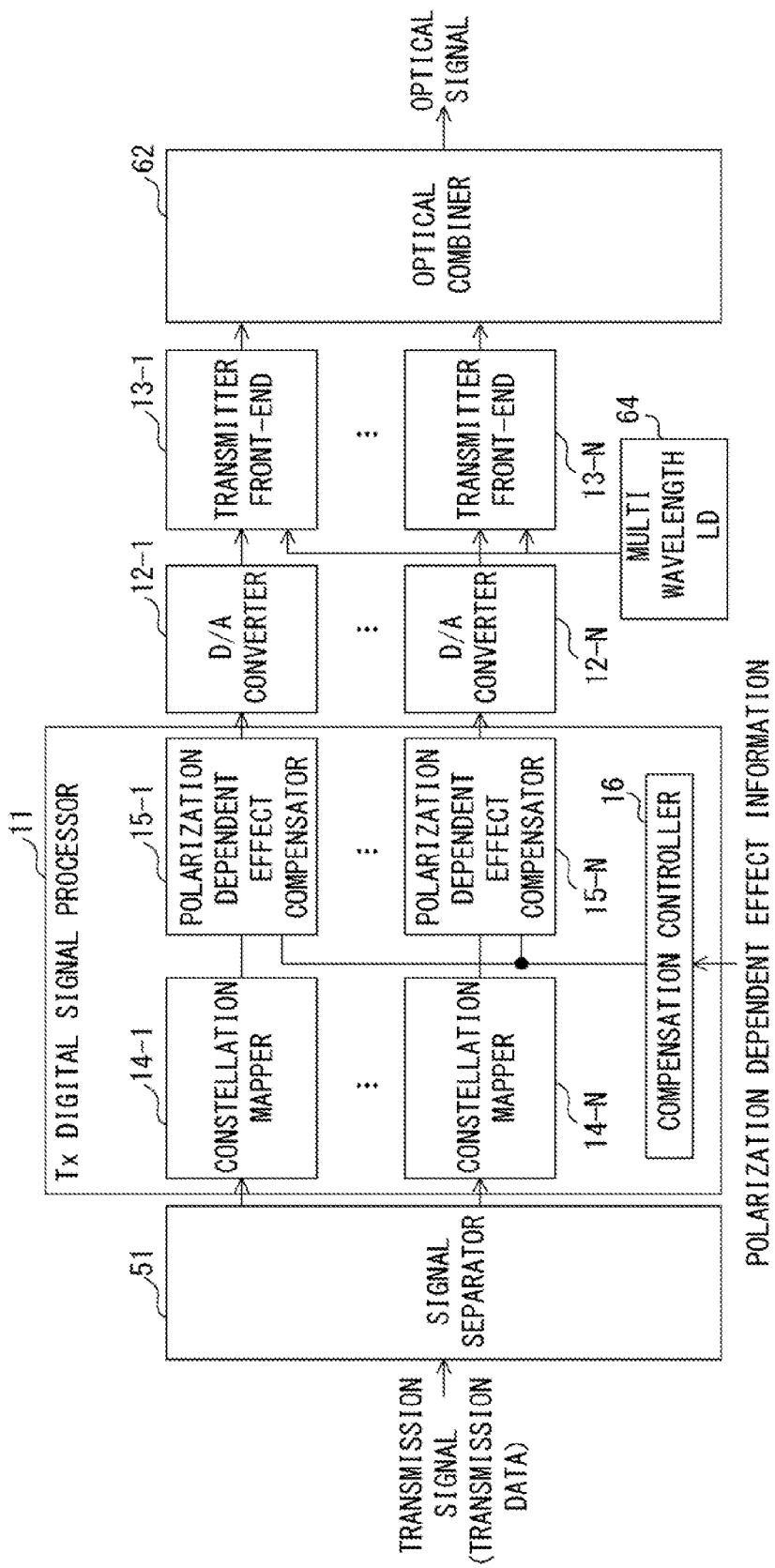
FIG. 20A illustrates still another example of the configuration of the optical transmitter according to the third embodiment.

FIG. 20A illustrates still another example of the configuration of the optical transmitter according to the third embodiment. In the example illustrated in FIG. 20A, the optical transmitter 10 includes a multi-wavelength light source 64. The multi-wavelength light source 64 generates a plurality of carrier waves that differ in wavelength (i.e. frequency) but that synchronize in phase each other. The carrier waves are given to the corresponding transmitter front-ends 13-1 to 13-N. The transmitter front-ends 13-1 to 13-N respectively generate polarization multiplexed optical signals by modulating the carrier waves by the corresponding electric-field information signals.

Figure 20B:
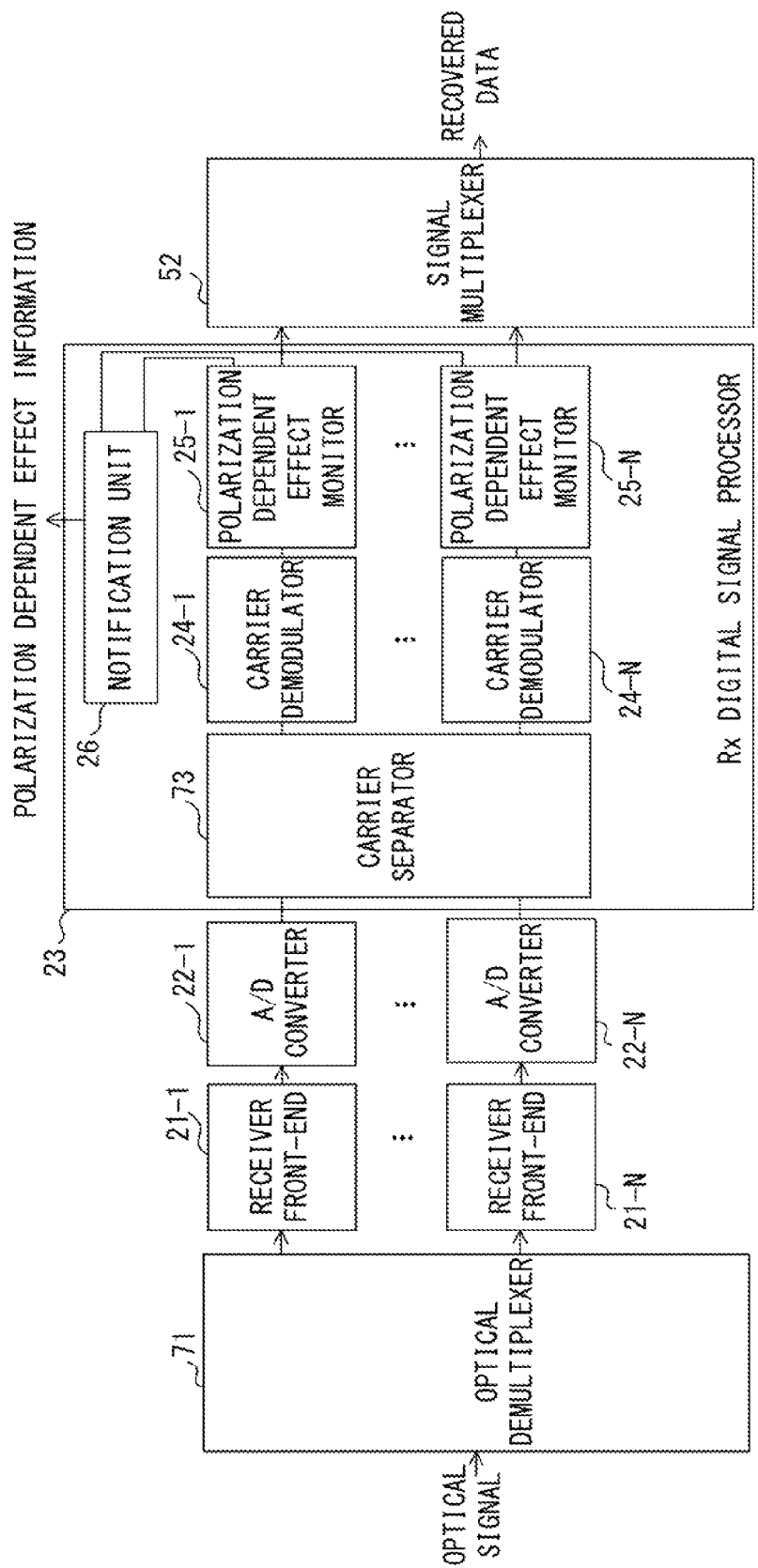
FIG. 20B illustrates an example of the configuration of the optical receiver corresponding to the optical transmitter illustrated in FIG. 20A.

FIG. 20B illustrates an example of the configuration of the optical receiver corresponding to the optical transmitter illustrated in FIG. 20A. In the example illustrated in FIG. 20B, the Rx digital signal processor 23 may include a carrier separator 73. The carrier separator 73 separates electric signals representing the received optical signals for each subcarrier, and guides the electric signals to the carrier demodulators 24-1 to 24-N.

FIG. 21 illustrates still another example of the configuration of the optical transmitter according to the third embodiment. In the example illustrated in FIG. 21, the electric-field information signals generated by the constellation mapper 14 are converted by the FFT unit 65 into electric-field information signals in frequency domain. The polarization-dependent effect compensators 15-1 to 15-N correct corresponding electric-field information signals. The IFFT unit 66 converts signals output from the polarization-dependent effect compensators 15-1 to 15-N into electric-field information signals in time domain. The transmitter front-end 13 generates an optical signal from the corrected electric-field information signals output from the Tx digital signal processor 11.

The optical receiver illustrated in FIGS. 18B, 19B, and 20B detects polarization dependent effects on polarization multiplexed optical signals. The notification unit 26 sends polarization-dependent effect information representing the polarization dependent effects on the polarization multiplexed optical signal to the optical transmitter 10.

The optical transmitter illustrated in FIGS. 18A, 19A, 20A, and 21 corrects the electric-field information signals of the carriers or subcarriers based on the polarization-dependent effect information received from the optical receiver. The optical transmitter generates a polarization multiplexed optical signal from the corrected electric-field information signal and outputs the optical signal to the optical transmission line.

Other Embodiments

In the first to third embodiments described above, the optical receiver 20 detects polarization dependent effects on the received optical signal, and sends the polarization-dependent effect information representing the polarization dependent effects to the optical transmitter 10. The optical transmitter 10 corrects electric field information for generating a polarization multiplexed optical signal based on the polarization-dependent effect information received from the optical receiver 20. That is, feedback control for suppressing the polarization dependent effects on the polarization multiplexed optical signal is performed.

This invention, however, is not limited to this configuration. For example, when a plurality of polarization multiplexed optical signals are transmitted using a plurality of carriers or subcarriers, the optical transmission system does not necessarily perform the above feedback control. In such a case, the Tx digital signal processor 11 of the optical transmitter 10 selects randomly or substantially randomly the compensation amounts (parameters θ, ε, PDL, a) given to the polarization-dependent effect compensators 15-1 to 15-N. The polarization-dependent effect compensators 15-1 to 15-N correct the corresponding electric-field information signals according to the given parameters.

This configuration gives different polarization characteristics to each carrier. That is, carriers with large OSNR differences between the polarizations (i.e., differences in OSNR between x-polarization and y-polarization) and carriers with small OSNR differences between polarizations are randomly arranged. This mitigates the influence of carriers with poor characteristics. Particularly for a system that transmits one data sequence using many subcarriers, the configuration adequately mitigates the influence of carriers with poor characteristics, thereby improving reception characteristics of the entire transmission system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission system, comprising:
an optical transmitter; and
an optical receiver, wherein
the optical transmitter includes:
a first digital signal processor configured to generate an electric-field information signal corresponding to a transmission signal; and
a transmitter front-end configured to generate an optical signal from the electric-field information signal,
the optical receiver includes:
a receiver front-end configured to generate an electric signal corresponding to the optical signal; and
a second digital signal processor configured to detect polarization dependent effects on the optical signal based on the electric signal, and wherein
the first digital signal processor generates a plurality of electric-field information signals corresponding to the transmission signal, each of the electric-field information signals including a first polarization signal and a second polarization signal corresponding to respective orthogonal polarizations, and frequency-multiplexes the plurality of electric-field information signals,
the transmitter front-end generates an optical signal that includes a plurality of sub-carriers from a signal that represents the frequency-multiplexed plurality of electric-field information signals,
the receiver front-end generates an electric signal that represents the optical signal generated by the transmitter front-end,
the second digital signal processor detects polarization dependent effects respectively on the sub-carriers included in the optical signal based on the electric signal, and
the first digital signal processor respectively corrects the electric-field information signals by respectively performing rotation transformation for controlling the mixing of the first polarization signal and the second polarization signal, amplitude control for controlling the amplitude of the first polarization signal and the amplitude of the second polarization signal, and phase shift for controlling the phases of the first polarization signal and the second polarization signal on each of the electric-field information signals, based on the polarization dependent effects respectively on the sub-carriers detected by the second digital signal processor in the optical receiver.

2. The optical transmission system according to claim 1, wherein the first digital signal processor corrects at least some of the plurality of electric-field information signals at different timing.

3. A optical transmission system comprising:
an optical transmitter; and
an optical receiver, wherein
the optical transmitter includes:
a first digital signal processor configured to generate an electric-field information signal corresponding to a transmission signal; and
a transmitter front-end configured to generate an optical signal from the electric-field information signal,
the optical receiver includes:
a receiver front-end configured to generate an electric signal corresponding to the optical signal; and
a second digital signal processor configured to detect polarization dependent effects on the optical signal based on the electric signal, and wherein
the transmission signal is transmitted from the optical transmitter to the optical receiver in a frame having a specified structure,
the second digital signal processor detects polarization dependent effects on the optical signal for every frame, and
the first digital signal processor corrects the electric-field information signal in synchronization with frame periods based on the polarization dependent effects detected by the second digital signal processor.

4. The optical transmission system according to claim 3, wherein
the frame includes a first check bit and a second check bit respectively corresponding to a first polarization and a second polarization orthogonal to each other,
the first digital signal processor performs mapping in such a way that the first check bit is transmitted by the first polarization and the second check bit is transmitted by the second polarization, and
the second digital signal processor detects the polarization dependent effects on the optical signal for every frame based on an error rate of the first check bit and an error rate of the second check bit.

5. The optical transmission system according to claim 3, wherein
the frame includes first data and second data respectively corresponding to a first polarization and second polarization orthogonal to each other, and a first error correction code and a second error correction code respectively corresponding to the first data and the second data,
the first digital signal processor performs mapping in such a way that the first data and the first error correction code are transmitted by the first polarization and the second data and the second error correction code are transmitted by the second polarization, and
the second digital signal processor detects the polarization dependent effects on the optical signal for every frame based on the number of error corrections detected by using the first error correction code and the number of error corrections detected by using the second error correction code.

6. An optical transmitter, comprising:
a digital signal processor configured to generate an electric-field information signal corresponding to a transmission signal; and
a transmitter front-end configured to generate an optical signal from the electric-field information signal, wherein
the digital signal processor generates a plurality of electric-field information signals corresponding to the transmission signal, each of the electric-field information signals including a first polarization signal and a second polarization signal corresponding to respective orthogonal polarizations, and frequency-multiplexes the plurality of electric-field information signals,
the transmitter front-end generates an optical signal that includes a plurality of sub-carriers from a signal that represents the frequency-multiplexed plurality of electric-field information signals, and
the digital signal processor respectively corrects the electric-field information signals by respectively performing rotation transformation for controlling the mixing of the first polarization signal and the second polarization signal, amplitude control for controlling the amplitude of the first polarization signal and the amplitude of the second polarization signal, and phase shift for controlling the phases of the first polarization signal and the second polarization signal on each of the electric-field information signals, based on polarization dependent effects respectively on the sub-carriers detected by an optical receiver that receives the optical signal generated by the transmitter front-end.

7. A method of transmitting an optical signal, comprising:

generating a plurality of electric-field information signals corresponding to a transmission signal, each of the electric-field information signals including a first polarization signal and a second polarization signal corresponding to respective orthogonal polarizations at an optical transmitter;

frequency-multiplexing the plurality of electric-field information signals at the optical transmitter;

generating an optical signal that includes a plurality of sub-carriers from a signal that represents the frequency-multiplexed plurality of electric-field information signals at the optical transmitter;

transmitting the optical signal from the optical transmitter to an optical receiver;

converting the optical signal into an electric signal at the optical receiver;

detecting polarization dependent effects respectively on the sub-carriers included in the optical signal based on the electric signal at the optical receiver;

sending information representing the polarization dependent effects from the optical receiver to the optical transmitter; and respectively correcting the electric-field information signals at the optical transmitter by respectively performing rotation transformation for controlling the mixing of the first polarization signal and the second polarization signal, amplitude control for controlling the amplitude of the first polarization signal and the amplitude of the second polarization signal, and phase shift for controlling the phases of the first polarization signal and the second polarization signal on each of the electric-field information signals, based on the polarization dependent effects respectively on the sub-carriers detected by the optical receiver.

* * * * *